United States Patent
Zhou et al.

(10) Patent No.: US 12,457,481 B2
(45) Date of Patent: Oct. 28, 2025

(54) EVENT SUBSCRIPTION MANAGEMENT METHOD AND APPARATUS

(71) Applicant: HUAWEI TECHNOLOGIES CO., LTD., Shenzhen (CN)

(72) Inventors: Xiaoyun Zhou, Nanjing (CN); Yali Yan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 439 days.

(21) Appl. No.: 17/984,588

(22) Filed: Nov. 10, 2022

(65) Prior Publication Data
US 2023/0060429 A1  Mar. 2, 2023

Related U.S. Application Data

(63) Continuation of application No. PCT/CN2021/089592, filed on Apr. 25, 2021.

(30) Foreign Application Priority Data

May 13, 2020 (CN) .......................... 202010404076.6

(51) Int. Cl.
  *H04W 8/18* (2009.01)
  *H04W 4/50* (2018.01)
  *H04W 8/04* (2009.01)

(52) U.S. Cl.
  CPC ............ *H04W 4/50* (2018.02); *H04W 8/04* (2013.01); *H04W 8/186* (2013.01)

(58) Field of Classification Search
  CPC ....... H04W 24/08; H04W 24/10; H04W 4/70; H04W 8/186; H04W 4/08; H04W 24/02;
  (Continued)

(56) References Cited

U.S. PATENT DOCUMENTS

| 2016/0277243 | A1* | 9/2016 | Kim ................... H04L 41/0816 |
| 2019/0394712 | A1* | 12/2019 | Rönneke ................ H04W 4/70 |
| 2021/0385672 | A1* | 12/2021 | Merino Vazquez .. H04W 24/04 |

FOREIGN PATENT DOCUMENTS

| CN | 110139264 A | 8/2019 |
| CN | 110366199 A * | 10/2019 ........... H04L 41/069 |

(Continued)

OTHER PUBLICATIONS

S2-173579, Huawei et al., Enable T8 for MONTE procedures, SA WG2 Meeting #121 Hangzhou, PRC, May 15-19, 2017, 31 pages.
(Continued)

*Primary Examiner* — Quan M Hua
(74) *Attorney, Agent, or Firm* — HAUPTMAN HAM, LLP

(57) ABSTRACT

A communication method includes receiving, by a Service Capability Exposure Function (SCEF) element, an indication message, determining information about a first subscription event configuration based on the indication message, sending a delete message to a second network element to indicate to the second network element to delete the first subscription event configuration. The indication message includes identification information of a subscription event configuration, identification information of a user, and indication information. The identification information of the subscription event configuration is useable to indicate a first subscription event configuration of a user group to which the user belongs. The indication information is useable to cancel an event subscription of the user in the first subscription event configuration. The information about the first subscription event configuration includes group member information of the user group, or information about a quantity of subscription event reporting times of the user.

20 Claims, 15 Drawing Sheets

(58) Field of Classification Search
CPC ....... H04W 8/08; H04W 8/04; H04W 68/005; H04W 4/029; H04W 8/12; H04W 8/18; H04W 24/00; H04W 8/02; H04W 24/04; H04W 48/04; H04M 15/00; H04M 15/66; H04L 43/06; H04L 67/306; H04L 67/53; H04L 41/069; H04L 67/55
See application file for complete search history.

(56) References Cited

FOREIGN PATENT DOCUMENTS

| WO | WO-2019196773 A1 * | 10/2019 | ............ H04W 24/00 |
|---|---|---|---|
| WO | 2020103662 A1 | 5/2020 | |

OTHER PUBLICATIONS

S2-1905512(Revision of S2-1904512), Huawei et al., Enhancement of Monitoring Event configuration, 3GPP TSG-SA2 Meeting #133, May 13-17, 2019, Reno, NV, USA, 11 pages.
3GPP TS 23.286 V16.3.0 (Mar. 2020), 3rd Generation Partnership Project; Technical Specification Group Services and System Aspects;Application layer support forVehicle-to-Everything (V2X) services; Functional architecture and information flows; (Release 16), 64 pages.
S2-184404, Huawei et al., Monitoring Event configuration removal for a group, 3GPP TSG-SA WG2 Meeting #127,Apr. 16-20, 2018, 8 pages.
3GPP TS 23.502 V16.4.0 (Mar. 2020), 3rd Generation Partnership Project; Technical Specification Group Services and System Aspects; Procedures for the 5G System (5GS); Stage 2(Release 16), 582 pages.
3GPP TS 23.682 V16.6.0 (Mar. 2020-03), 3rd Generation Partnership Project; Technical Specification Group Services and System Aspects; Architecture enhancements to facilitate communications with packet data networks and applications (Release 16), 134 pages.
S2-2002031(revision of S2-1912477), Ericsson, Dynamic management of group-based event monitoring, Sa WG2 Meeting #S2-137E, Feb. 24-27, 2020, Electronic meeting, 3 pages.
International Search Report issued in corresponding International Application No. PCT/CN2021/089592, dated Jul. 2, 2021, pp. 1-13.
Extended European Search Report issued in corresponding European Application No. 21804508.6, dated Sep. 15, 2023, pp. 1-8.

* cited by examiner

EVENT SUBSCRIPTION MANAGEMENT METHOD AND APPARATUS

CROSS-REFERENCE TO RELATED APPLICATIONS

This application is a continuation of International Application No. PCT/CN2021/089592, filed on Apr. 25, 2021, which claims priority to Chinese Patent Application No. 202010404076.6, filed on May 13, 2020. The disclosures of the aforementioned applications are hereby incorporated by reference in their entireties.

TECHNICAL FIELD

Embodiments of this application relate to the communication field, and in particular, to an event subscription management method and an apparatus.

BACKGROUND

Currently, a service capability exposure (Service Capability Exposure, SCE) architecture may provide a service capability for a third-party service provider, for example, provide an event monitoring capability. The SCE architecture may perform event monitoring (Event Monitoring) on each user in a user group according to an instruction released by the third party.

However, event monitoring management in an existing technology can only implement management at a granularity of a group, for example, cancel event monitoring of a user group, delete a user group, or add a user group, but cannot implement event monitoring management at a granularity of a user.

SUMMARY

This application provides an event monitoring management method, an apparatus, and a system, to implement event monitoring management at a granularity of a user.

To achieve the foregoing objective, this application uses the following technical solutions.

According to a first aspect, an embodiment of this application provides an event monitoring management method. The method includes: receiving an indication message, where the indication message includes identification information of a monitoring event configuration, identification information of a user, and indication information, the identification information of the monitoring event configuration is used to indicate a first monitoring event configuration of a user group to which the user belongs, and the indication information is used to indicate to cancel event monitoring of the user in the first monitoring event configuration; determining information about the first monitoring event configuration based on the indication message, where the information about the first monitoring event configuration includes at least one of the following: group member information of the user group and information about a quantity of monitoring event reporting times of the user; and sending a delete message to a second network element, to indicate the second network element to delete the first monitoring event configuration, where the delete message is sent to the second network element after it is determined, based on the information about the first monitoring event configuration, that reporting of first event monitoring is completed.

Based on the foregoing manner, a more flexible management manner is provided. When event monitoring of a user is managed, event monitoring of another user is not affected, so that event monitoring management at a granularity of a user is implemented.

In a possible implementation, the information about the first monitoring event configuration indicates to remove a monitoring event report corresponding to the user when statistics about a report of the first monitoring event configuration of the user group are collected.

Based on the foregoing manner, a specific execution manner for a user whose event monitoring is to be canceled is implemented, to be specific, a monitoring event report of the user is removed, so that a management manner at a granularity of a user is implemented.

In a possible implementation, the group member information of the user group includes: a quantity of group members in the user group is a difference between a currently stored quantity of group members in the user group and a quantity of the user.

Based on the foregoing manner, a to-be-canceled user may be removed by modifying a quantity of group members in a user group.

In a possible implementation, the group member information of the user group includes: a member user of the user group is obtained after the user is deleted from currently stored member users of the user group.

Based on the foregoing manner, a to-be-canceled user may be removed by modifying a list of group members in a user group.

In a possible implementation, the group member information of the user group includes the identification information of the user and mark information, where the mark information is used to indicate to remove the monitoring event report corresponding to the user when the statistics about the report of the first monitoring event configuration of the user group are collected.

Based on the foregoing manner, a to-be-canceled user is removed by marking the user that needs to be canceled.

In a possible implementation, the determining information about the first monitoring event configuration includes: deleting the stored quantity of monitoring event reporting times of the user; and the quantity of group members in the user group is the difference between the currently stored quantity of group members in the user group and the quantity of the user.

Based on the foregoing manner, a to-be-canceled user may be removed by modifying a quantity of group members in a user group and deleting a received report of the user.

In a possible implementation, the determining information about the first monitoring event configuration includes: deleting the stored quantity of monitoring event reporting times of the user; and the group member information of the user group includes the identification information of the user and the mark information, where the mark information is used to indicate to remove the monitoring event report corresponding to the user when the statistics about the report of the first monitoring event configuration of the user group are collected.

Based on the foregoing manner, a to-be-canceled user may be removed by deleting a received report of the user and marking the user.

In a possible implementation, the determining information about the first monitoring event configuration includes: deleting the stored quantity of monitoring event reporting times of the user; and the member user of the user group is obtained after the user is deleted from the currently stored member users of the user group.

Based on the foregoing manner, a to-be-canceled user may be removed by deleting a received report of the user and modifying a list of group members in a user group.

In a possible implementation, the determining information about the first monitoring event configuration includes: setting the quantity of monitoring event reporting times of the user to a maximum quantity of reporting times. In other words, it is considered by default that reporting of the user is completed.

Based on the foregoing manner, a to-be-canceled user may also be removed by setting a quantity of monitoring event reporting times of the user whose event monitoring is to be canceled to a maximum value.

In a possible implementation, the indication message further includes event monitoring type information, and the indication information is used to indicate to cancel first event monitoring of the user in the first event monitoring configuration, where the event monitoring type information indicates an event monitoring type of the first event monitoring.

In a possible implementation, the information about the first monitoring event configuration indicates to remove a monitoring event report of the first event monitoring corresponding to the user when the statistics about the report of the first monitoring event configuration of the user group are collected.

In a possible implementation, the determining information about the first monitoring event configuration includes: setting the quantity of monitoring event reporting times of the user to a maximum quantity of reporting times. In other words, it is considered by default that reporting of the user is completed.

In a possible implementation, the indication message further includes validity indication information, where the validity indication information is used to indicate that content indicated by the indication information is continuously valid.

According to a second aspect, an embodiment of this application provides an event monitoring management method. The method includes: receiving an indication message, where the indication message includes identification information of a user group, identification information of a user, and indication information, the identification information of the user group is used to indicate the user group to which the user belongs, and the indication information is used to indicate to delete the user from the user group or add the user to the user group; determining, based on the indication message, information about a monitoring event configuration corresponding to the user group, where the information about the monitoring event configuration includes at least one of the following: group member information of the user group and information about a quantity of monitoring event reporting times of the user; and sending a delete message to a second network element, to indicate the second network element to delete the monitoring event configuration, where the delete message is sent to the second network element after it is determined, based on the information about the monitoring event configuration, that reporting of event monitoring is completed.

Based on the foregoing manner, a more flexible management manner is provided. When event monitoring of a user is managed, event monitoring of another user is not affected, so that event monitoring management at a granularity of a user is implemented.

In a possible implementation, the indication information is used to indicate to delete the user from the user group, and the information about the monitoring event configuration indicates to remove a monitoring event report corresponding to the user when statistics about a report of the monitoring event configuration of the user group are collected.

In a possible implementation, the indication information is used to indicate to delete the user from the user group, and a quantity of group members in the user group is a difference between a currently stored quantity of group members in the user group and a quantity of the user.

In a possible implementation, the indication information is used to indicate to delete the user from the user group, and a member user of the user group is obtained after the user is deleted from currently stored member users of the user group.

In a possible implementation, the determining information about a monitoring event configuration corresponding to the user group includes: deleting the stored quantity of monitoring event reporting times of the user; and the quantity of group members in the user group is the difference between the currently stored quantity of group members in the user group and the quantity of the user.

In a possible implementation, the determining information about a monitoring event configuration corresponding to the user group includes: the group member information of the user group includes the identification information of the user and mark information, where the mark information is used to indicate to remove the monitoring event report corresponding to the user when the statistics about the report of the first monitoring event configuration of the user group are collected.

In a possible implementation, the determining information about a monitoring event configuration corresponding to the user group includes: deleting the stored quantity of monitoring event reporting times of the user; and the group member information of the user group includes the identification information of the user and the mark information, where the mark information is used to indicate to remove the monitoring event report corresponding to the user when the statistics about the report of the first monitoring event configuration of the user group are collected.

In a possible implementation, the determining information about a monitoring event configuration corresponding to the user group includes: deleting the stored quantity of monitoring event reporting times of the user; and the member user of the user group is obtained after the user is deleted from the currently stored member users of the user group.

In a possible implementation, the determining information about a monitoring event configuration corresponding to the user group includes: identifying the quantity of monitoring event reporting times of the user to a maximum quantity of reporting times.

In a possible implementation, the indication information is used to add the user to the user group, and the information about the monitoring event configuration indicates to collect statistics on the quantity of monitoring event reporting times corresponding to the user.

In a possible implementation, the indication information is used to add the user to the user group, and a quantity of group members in the user group is a sum of a currently stored quantity of group members in the user group and a quantity of the user.

In a possible implementation, the indication information is used to indicate to add the user to the user group, and member users of the user group are obtained after the user is added to a currently stored member user of the user group.

In a possible implementation, the indication message further includes validity indication information, where the validity indication information is used to indicate that content indicated by the indication information is continuously valid.

According to a third aspect, an embodiment of this application provides an event monitoring management method. The method includes: receiving an indication message, where the indication message includes identification information of a monitoring event configuration, identification information of a user, and indication information, the identification information of the monitoring event configuration is used to indicate a first monitoring event configuration of a user group to which the user belongs, and the indication information is used to indicate to cancel event monitoring of the user in the first monitoring event configuration; and canceling the event monitoring of the user in the first monitoring event configuration based on the indication message.

Based on the foregoing manner, a more flexible management manner is provided. When event monitoring of a user is managed, event monitoring of another user is not affected, so that event monitoring management at a granularity of a user is implemented.

In a possible implementation, the indication message further includes an event monitoring type, and the canceling the event monitoring of the user in the first monitoring event configuration includes: canceling event monitoring, of the event monitoring type, of the user in the first monitoring event configuration.

In a possible implementation, the method further includes: determining a context of the user based on the indication message, where the context of the user indicates to cancel the event monitoring of the user in the first monitoring event configuration.

Based on the foregoing manner, a user is marked, so that after the user is migrated to another network element, the another network element can continue to perform event monitoring management on the user based on a mark.

In a possible implementation, the method further includes: sending the context of the user to a fourth network element, to indicate the fourth network element to cancel the event monitoring of the user in the first monitoring event configuration.

According to a fourth aspect, an embodiment of this application provides an event monitoring management method. The method includes: receiving an indication message, where the indication message includes identification information of a user group, identification information of a user, and indication information, the identification information of the user group is used to indicate the user group, and the indication information is used to indicate to delete the user from the user group or add the user to the user group; and if the indication information is used to indicate to delete the user from the user group, canceling event monitoring of the user in a monitoring event configuration corresponding to the user group; or if the indication information is used to indicate to add the user to the user group, starting to perform event monitoring on the user in a monitoring event configuration corresponding to the user group.

Based on the foregoing manner, a more flexible management manner is provided. When event monitoring of a user is managed, event monitoring of another user is not affected, so that event monitoring management at a granularity of a user is implemented.

In a possible implementation, the indication information is used to indicate to delete the user from the user group, and the method further includes: updating a context of the user, where an updated context of the user indicates that the user does not belong to the user group.

Based on the foregoing manner, a user is marked, so that after the user is migrated to another network element, the another network element can continue to perform event monitoring management on the user based on a mark.

In a possible implementation, the indication information is used to indicate to add the user to the user group, and the method further includes: updating a context of the user, where an updated context of the user indicates that the user belongs to the user group.

According to a fifth aspect, an embodiment of this application provides an event monitoring management method. The method includes: receiving a first indication message, where the first indication message includes identification information of a user group, identification information of a user, and indication information, the identification information of the user group is used to indicate the user group to which the user belongs, and the indication information is used to indicate to delete the user from the user group or add the user to the user group; and sending a second indication message to a first network element based on the first indication message, where the second indication message includes identification information of a monitoring event configuration and group member information of the user group, and the identification information of the monitoring event configuration is used to indicate the monitoring event configuration of the user group.

In a possible implementation, if the indication information indicates to delete the user from the user group, group member update information is the identification information of the user.

In a possible implementation, if the indication information indicates to add the user to the user group, group member update information is the identification information of the user or a quantity of users in the user group.

In a possible implementation, if the indication information indicates to delete the user from the user group, the method further includes: sending a third indication message to a third network element, where the third indication message includes a user group set to which the user belongs, and the user group set does not include the user group.

In a possible implementation, if the indication information indicates to add the user to the user group, the method further includes: sending a third indication message to a third network element, where the third indication message includes a user group set to which the user belongs, and the user group set includes the user group.

According to a sixth aspect, an embodiment of this application provides an apparatus. The apparatus includes: a memory and a processor, where the memory is coupled to the processor. The memory stores program instructions; and when the program instructions are run by the processor, the apparatus is enabled to perform the following steps: receiving an indication message, where the indication message includes identification information of a monitoring event configuration, identification information of a user, and indication information, the identification information of the monitoring event configuration is used to indicate a first monitoring event configuration of a user group to which the user belongs, and the indication information is used to indicate to cancel event monitoring of the user in the first monitoring event configuration; determining information about the first monitoring event configuration based on the indication message, where the information about the first monitoring event configuration includes at least one of the following: group member information of the user group and information about a quantity of monitoring event reporting times of the user; and sending a delete message to a second network element, to indicate the second network element to delete the first monitoring event configuration, where the delete message is sent to the second network element after it is determined, based on the information about the first monitoring event configuration, that reporting of first event monitoring is completed.

In a possible implementation, the information about the first monitoring event configuration indicates to remove a monitoring event report corresponding to the user when statistics about a report of the first monitoring event configuration of the user group are collected.

In a possible implementation, the group member information of the user group includes: a quantity of group members in the user group is a difference between a currently stored quantity of group members in the user group and a quantity of the user.

In a possible implementation, the group member information of the user group includes: a member user of the user group is obtained after the user is deleted from currently stored member users of the user group.

In a possible implementation, the group member information of the user group includes the identification information of the user and mark information, where the mark information is used to indicate to remove the monitoring event report corresponding to the user when the statistics about the report of the first monitoring event configuration of the user group are collected.

In a possible implementation, when the program instructions are run by the processor, the apparatus is enabled to perform the following step: deleting the stored quantity of monitoring event reporting times of the user; and the quantity of group members in the user group is the difference between the currently stored quantity of group members in the user group and the quantity of the user.

In a possible implementation, when the program instructions are run by the processor, the apparatus is enabled to perform the following step: deleting the stored quantity of monitoring event reporting times of the user; and the group member information of the user group includes the identification information of the user and the mark information, where the mark information is used to indicate to remove the monitoring event report corresponding to the user when the statistics about the report of the first monitoring event configuration of the user group are collected.

In a possible implementation, when the program instructions are run by the processor, the apparatus is enabled to perform the following step: deleting the stored quantity of monitoring event reporting times of the user; and the member user of the user group is obtained after the user is deleted from the currently stored member users of the user group.

In a possible implementation, when the program instructions are run by the processor, the apparatus is enabled to perform the following step: setting the quantity of monitoring event reporting times of the user to a maximum quantity of reporting times. In other words, it is considered by default that reporting of the user is completed.

In a possible implementation, the indication message further includes event monitoring type information, and the indication information is used to indicate to cancel first event monitoring of the user in the first event monitoring configuration, where the event monitoring type information indicates an event monitoring type of the first event monitoring.

In a possible implementation, the information about the first monitoring event configuration indicates to remove a monitoring event report of the first event monitoring corresponding to the user when the statistics about the report of the first monitoring event configuration of the user group are collected.

In a possible implementation, when the program instructions are run by the processor, the apparatus is enabled to perform the following step: setting the quantity of monitoring event reporting times of the user to a maximum quantity of reporting times. In other words, it is considered by default that reporting of the user is completed.

In a possible implementation, the indication message further includes validity indication information, where the validity indication information is used to indicate that content indicated by the indication information is continuously valid.

According to a seventh aspect, an embodiment of this application provides an apparatus. The apparatus includes: a memory and a processor, where the memory is coupled to the processor. The memory stores program instructions; and when the program instructions are run by the processor, the apparatus is enabled to perform the following steps: receiving an indication message, where the indication message includes identification information of a user group, identification information of a user, and indication information, the identification information of the user group is used to indicate the user group to which the user belongs, and the indication information is used to indicate to delete the user from the user group or add the user to the user group; determining, based on the indication message, information about a monitoring event configuration corresponding to the user group, where the information about the monitoring event configuration includes at least one of the following: group member information of the user group and information about a quantity of monitoring event reporting times of the user; and sending a delete message to a second network element, to indicate the second network element to delete the monitoring event configuration, where the delete message is sent to the second network element after it is determined, based on the information about the monitoring event configuration, that reporting of event monitoring is completed.

In a possible implementation, the indication information is used to indicate to delete the user from the user group, and the information about the monitoring event configuration indicates to remove a monitoring event report corresponding to the user when statistics about a report of the monitoring event configuration of the user group are collected.

In a possible implementation, the indication information is used to indicate to delete the user from the user group, and a quantity of group members in the user group is a difference between a currently stored quantity of group members in the user group and a quantity of the user.

In a possible implementation, the indication information is used to indicate to delete the user from the user group, and a member user of the user group is obtained after the user is deleted from currently stored member users of the user group.

In a possible implementation, when the program instructions are run by the processor, the apparatus is enabled to perform the following step: deleting the stored quantity of monitoring event reporting times of the user; and the quantity of group members in the user group is the difference between the currently stored quantity of group members in the user group and the quantity of the user.

In a possible implementation, the group member information of the user group includes the identification information of the user and mark information, where the mark information is used to indicate to remove the monitoring event report corresponding to the user when the statistics about the report of the monitoring event configuration of the user group are collected.

In a possible implementation, when the program instructions are run by the processor, the apparatus is enabled to perform the following step: deleting the stored quantity of monitoring event reporting times of the user; and the group member information of the user group includes the identification information of the user and the mark information, where the mark information is used to indicate to remove the monitoring event report corresponding to the user when the statistics about the report of the first monitoring event configuration of the user group are collected.

In a possible implementation, when the program instructions are run by the processor, the apparatus is enabled to perform the following step: deleting the stored quantity of monitoring event reporting times of the user; and the member user of the user group is obtained after the user is deleted from the currently stored member users of the user group.

In a possible implementation, when the program instructions are run by the processor, the apparatus is enabled to perform the following step: identifying the quantity of monitoring event reporting times of the user to a maximum quantity of reporting times.

In a possible implementation, the indication information is used to add the user to the user group, and the information about the monitoring event configuration indicates to collect statistics on the quantity of monitoring event reporting times corresponding to the user.

In a possible implementation, the indication information is used to add the user to the user group, and a quantity of group members in the user group is a sum of a currently stored quantity of group members in the user group and a quantity of the user.

In a possible implementation, the indication information is used to add the user to the user group, and member users of the user group are obtained after the user is added to a currently stored member user of the user group.

In a possible implementation, the indication message further includes validity indication information, where the validity indication information is used to indicate that content indicated by the indication information is continuously valid.

According to an eighth aspect, an embodiment of this application provides an apparatus. The apparatus includes: a memory and a processor, where the memory is coupled to the processor. The memory stores program instructions; and when the program instructions are run by the processor, the apparatus is enabled to perform the following steps: receiving an indication message, where the indication message includes identification information of a monitoring event configuration, identification information of a user, and indication information, the identification information of the monitoring event configuration is used to indicate a first monitoring event configuration of a user group to which the user belongs, and the indication information is used to indicate to cancel event monitoring of the user in the first monitoring event configuration; and canceling the event monitoring of the user in the first monitoring event configuration based on the indication message.

In a possible implementation, the indication message further includes an event monitoring type; and when the program instructions are run by the processor, the apparatus is enabled to perform the following step: canceling event monitoring, of the event monitoring type, of the user in the first monitoring event configuration.

In a possible implementation, when the program instructions are run by the processor, the apparatus is enabled to perform the following step: determining a context of the user based on the indication message, where the context of the user indicates to cancel the event monitoring of the user in the first monitoring event configuration.

In a possible implementation, when the program instructions are run by the processor, the apparatus is enabled to perform the following step: sending the context of the user to a fourth network element, to indicate the fourth network element to cancel the event monitoring of the user in the first monitoring event configuration.

According to a ninth aspect, an embodiment of this application provides an apparatus. The apparatus includes: a memory and a processor, where the memory is coupled to the processor. The memory stores program instructions; and when the program instructions are run by the processor, the apparatus is enabled to perform the following steps: receiving an indication message, where the indication message includes identification information of a user group, identification information of a user, and indication information, the identification information of the user group is used to indicate the user group, and the indication information is used to indicate to delete the user from the user group or add the user to the user group; and if the indication information is used to indicate to delete the user from the user group, canceling event monitoring of the user in a monitoring event configuration corresponding to the user group; or if the indication information is used to indicate to add the user to the user group, starting to perform event monitoring on the user in a monitoring event configuration corresponding to the user group.

In a possible implementation, the indication information is used to indicate to delete the user from the user group; and when the program instructions are run by the processor, the apparatus is enabled to perform the following step: updating a context of the user, where an updated context of the user indicates that the user does not belong to the user group.

In a possible implementation, the indication information is used to indicate to add the user to the user group; and when the program instructions are run by the processor, the apparatus is enabled to perform the following step: updating a context of the user, where an updated context of the user indicates that the user belongs to the user group.

According to a tenth aspect, an embodiment of this application provides an apparatus. The apparatus includes: a memory and a processor, where the memory is coupled to the processor. The memory stores program instructions; and when the program instructions are run by the processor, the apparatus is enabled to perform the following steps: receiving a first indication message, where the first indication message includes identification information of a user group, identification information of a user, and indication information, the identification information of the user group is used to indicate the user group to which the user belongs, and the indication information is used to indicate to delete the user from the user group or add the user to the user group; and sending a second indication message to a first network element based on the first indication message, where the second indication message includes identification information of a monitoring event configuration and group member information of the user group, and the identification information of the monitoring event is used to indicate the monitoring event configuration of the user group.

In a possible implementation, if the indication information indicates to delete the user from the user group, group member update information is the identification information of the user.

In a possible implementation, if the indication information indicates to add the user to the user group, group member update information is the identification information of the user or a quantity of users in the user group.

In a possible implementation, if the indication information indicates to delete the user from the user group, when the program instructions are run by the processor, the apparatus is enabled to perform the following step: sending a third indication message to a third network element, where the third indication message includes a user group set to which the user belongs, and the user group set does not include the user group.

In a possible implementation, if the indication information indicates to delete the user from the user group, when the program instructions are run by the processor, the apparatus is enabled to perform the following step: sending a third indication message to a third network element, where the third indication message includes a user group set to which the user belongs, and the user group set includes the user group.

According to an eleventh aspect, an embodiment of this application provides an apparatus. The apparatus includes a transceiver module and a processing module. The transceiver module is configured to receive an indication message, where the indication message includes identification information of a monitoring event configuration, identification information of a user, and indication information, the identification information of the monitoring event configuration is used to indicate a first monitoring event configuration of a user group to which the user belongs, and the indication information is used to indicate to cancel event monitoring of the user in the first monitoring event configuration. The processing module is configured to determine information about the first monitoring event configuration based on the indication message, where the information about the first monitoring event configuration includes at least one of the following: group member information of the user group and information about a quantity of monitoring event reporting times of the user. The transceiver module is further configured to send a delete message to a second network element, to indicate the second network element to delete the first monitoring event configuration, where the delete message is sent to the second network element after it is determined, based on the information about the first monitoring event configuration, that reporting of first event monitoring is completed.

According to a twelfth aspect, an embodiment of this application provides an apparatus. The apparatus includes a transceiver module and a processing module. The transceiver module is configured to receive an indication message, where the indication message includes identification information of a user group, identification information of a user, and indication information, the identification information of the user group is used to indicate the user group to which the user belongs, and the indication information is used to indicate to delete the user from the user group or add the user to the user group. The processing module is configured to determine, based on the indication message, information about a monitoring event configuration corresponding to the user group, where the information about the monitoring event configuration includes at least one of the following: group member information of the user group and information about a quantity of monitoring event reporting times of the user. The transceiver module is further configured to send a delete message to a second network element, to indicate the second network element to delete the monitoring event configuration, where the delete message is sent to the second network element after it is determined, based on the information about the monitoring event configuration, that reporting of event monitoring is completed.

According to a thirteenth aspect, an embodiment of this application provides an apparatus. The apparatus includes a transceiver module and a processing module. The transceiver module is configured to receive an indication message, where the indication message includes identification information of a monitoring event configuration, identification information of a user, and indication information, the identification information of the monitoring event configuration is used to indicate a first monitoring event configuration of a user group to which the user belongs, and the indication information is used to indicate to cancel event monitoring of the user in the first monitoring event configuration. The processing module is configured to cancel an event monitoring of the user in the first monitoring event configuration based on the indication message.

According to a fourteenth aspect, an embodiment of this application provides an apparatus. The apparatus includes a transceiver module and a processing module. The transceiver module is configured to receive an indication message, where the indication message includes identification information of a user group, identification information of a user, and indication information, the identification information of the user group is used to indicate the user group, and the indication information is used to indicate to delete the user from the user group or add the user to the user group. The processing module is configured to: if the indication information is used to indicate to delete the user from the user group, cancel event monitoring of the user in a monitoring event configuration corresponding to the user group; or if the indication information is used to indicate to add the user to the user group, start to perform event monitoring on the user in a monitoring event configuration corresponding to the user group.

According to a fifteenth aspect, an embodiment of this application provides an apparatus. The apparatus includes a transceiver module. The transceiver module is configured to receive a first indication message, where the first indication message includes identification information of a user group, identification information of a user, and indication information, the identification information of the user group is used to indicate the user group to which the user belongs, and the indication information is used to indicate to delete the user from the user group or add the user to the user group. The transceiver module is further configured to send a second indication message to a first network element based on the first indication message, where the second indication message includes identification information of a monitoring event configuration and group member information of the user group, and the identification information of the monitoring event is used to indicate the monitoring event configuration of the user group.

According to a sixteenth aspect, an embodiment of this application provides an event monitoring management system. The system includes an application server, a first network element, a second network element, and a third network element. The application server is configured to send a first indication message to the first network element, where the first indication message includes identification information of a monitoring event configuration, identification information of a user, and indication information, the identification information of the monitoring event configuration is used to indicate a first monitoring event configuration of a user group to which the user belongs, and the indication information is used to indicate to cancel event monitoring of the user in the first monitoring event configuration. The first network element is configured to determine information about the first monitoring event configuration based on the first indication message, where the information about the first monitoring event configuration includes at least one of the following: group member information of the user group and information about a quantity of monitoring event reporting times of the user. The first network element is configured to send a second indication message to the second network element, where the second indication message includes the identification information of the monitoring event configuration, the identification information of the user, and the indication information. The second network element is configured to send the second indication message to the third network element, to indicate the third network element to cancel the event monitoring of the user in the first monitoring event configuration. The third network element is configured to cancel the event monitoring of the user in the first monitoring event configuration based on the second indication message. The first network element is further configured to send a delete message to the second network element, to indicate the second network element to delete the first monitoring event configuration, where the delete message is sent to the second network element after it is determined, based on the information about the first monitoring event configuration, that reporting of first event monitoring is completed.

According to a seventeenth aspect, an embodiment of this application provides an event monitoring management system. The system includes an application server, a first network element, a second network element, and a third network element. The application server is configured to send a first indication message to the first network element, where the first indication message includes identification information of a user group, identification information of a user, and indication information, the identification information of the user group is used to indicate the user group to which the user belongs, and the indication information is used to indicate to delete the user from the user group or add the user to the user group. The first network element is configured to determine, based on the first indication message, information about a monitoring event configuration corresponding to the user group, where the information about the monitoring event configuration includes at least one of the following: group member information of the user group and information about a quantity of monitoring event reporting times of the user. The first network element is configured to send a second indication message to the second network element, where the second indication message includes the identification information of the user group, the identification information of the user, and the indication information. The second network element is configured to send the second indication message to the third network element, to indicate to delete the user from the user group or add the user to the user group. The third network element is configured to: if the indication information is used to indicate to delete the user from the user group, cancel event monitoring of the user in the monitoring event configuration corresponding to the user group; or if the indication information is used to indicate to add the user to the user group, start to perform event monitoring on the user in the monitoring event configuration corresponding to the user group. The first network element is further configured to send a delete message to the second network element, to indicate the second network element to delete the monitoring event configuration, where the delete message is sent to the second network element after it is determined, based on the information about the monitoring event configuration, that reporting of event monitoring is completed.

According to an eighteenth aspect, an embodiment of this application provides a computer-readable medium, configured to store a computer program. The computer program includes instructions for performing the method according to any one of the first aspect to the fifth aspect.

According to a nineteenth aspect, an embodiment of this application provides a computer program. The computer program includes instructions for performing the method according to any one of the first aspect to the fifth aspect.

According to a twentieth aspect, an embodiment of this application provides a chip. The chip includes a processing circuit and a transceiver pin. The transceiver pin and the processing circuit communicate with each other through an internal connection path. The processing circuit performs the method according to any one of the first aspect to the fifth aspect, to control a receive pin to receive a signal and control a transmit pin to send a signal.

BRIEF DESCRIPTION OF DRAWINGS

To describe technical solutions in embodiments of this application more clearly, the following briefly introduces the accompanying drawings for describing embodiments of this application. It is clear that the accompanying drawings in the following descriptions show merely some embodiments of this application, and a person of ordinary skill in the art may still derive other drawings from these accompanying drawings without creative efforts.

DETAILED DESCRIPTION OF EMBODIMENTS

Figure 1:
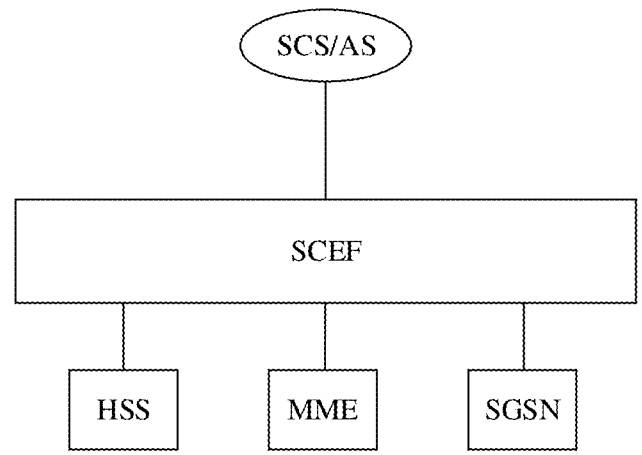
FIG. 1 is an example of a schematic diagram of a service capability exposure structure.

The following describes technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first target object, a second target object, and the like are used to distinguish between different target objects, but are not used to describe a particular order of the target objects.

In embodiments of this application, the term "example" or "for example" is used to represent giving an example, an illustration, or a description. Any embodiment or design scheme described as an "example" or "for example" in embodiments of this application should not be explained as being more or having more advantages than another embodiment or design scheme. Exactly, use of the term "example", "for example", or the like is intended to present a relative concept in a specific manner.

In descriptions of embodiments of this application, unless otherwise specified, "a plurality or means two or more than two. For example, a plurality of" processing units refer to two or more processing units, and a plurality of systems refer to two or more systems.

A user in embodiments of this application may also be referred to as user equipment (User Equipment, UE) or a terminal, or may be referred to as a mobile station (mobile station), a subscriber unit (subscriber unit), a station (station), terminal equipment (terminal equipment, TE), or the like. The terminal may be a cellular phone (cellular phone), a personal digital assistant (personal digital assistant, PDA), a wireless modem (modem), a handheld (handheld) device, a laptop computer (laptop computer), a cordless phone (cordless phone), a wireless local loop (wireless local loop, WLL) station, a tablet computer (pad), or the like. With development of wireless communication technologies, any device that can access a communication system, can communicate with a network side in the communication system, or can communicate with another object by using the communication system may be the user in embodiments of this application, for example, a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cashing machine.

To make a person skilled in the art better understand the technical solutions of this application, the following briefly describes related backgrounds.

(1) SCE Architecture

FIG. 1 is a diagram of a service capability exposure architecture in a 4th generation mobile communication technology (4th generation mobile communication technology, 4G) network. With reference to FIG. 1, the architecture includes a services capability server (Services Capability Server, SCS)/application server (Application Server, AS), a service capability exposure function (Service Capability Exposure Function, SCEF), a home subscriber server (Home Subscriber Server, HSS), a mobility management entity (Mobility Management Entity, MME), and a serving GPRS support node (Serving GPRS (General packet radio service, general packet radio service) Support Node, SGSN).

Specifically, the services capability server (Services Capability Server, SCS)/application server (Application Server, AS) may be considered as a third-party service provider. The SCEF is a core network element in the architecture, so that a network can securely provide a service capability for the SCS/AS. The HSS is a home user subscription server, and is configured to store subscription information of a user. The MME and the SGSN are network elements responsible for performing mobility management on UE. The SCS/AS invokes, through a T8 API interface, a service capability provided by the SCEF.

Figure 2:
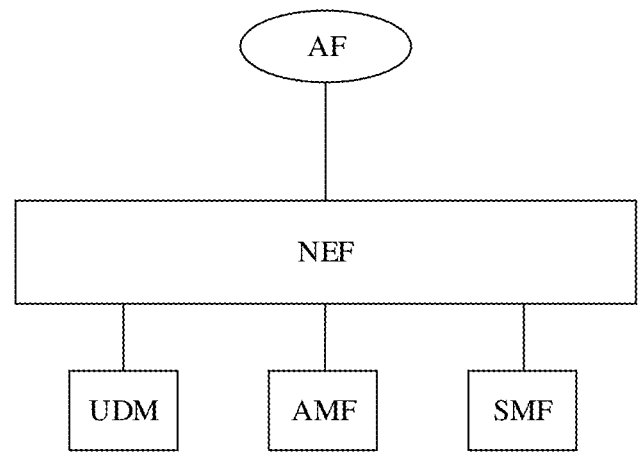
FIG. 2 is an example of a schematic diagram of a service capability exposure structure.

FIG. 2 is a diagram of a service capability exposure architecture in a 5th generation mobile communication technology (5th generation mobile communication technology, 5G) network. With reference to FIG. 2, the architecture includes an application function (Application Function, AF), a network exposure function (Network Exposure Function, NEF) unified data management (Unified Data Management, UDM), a core access and mobility management function (Core Access and Mobility Management Function, AMF), and a session management function (Session Management Function, SMF).

The NEF has a function similar to that of the SCEF in 4G, and may provide a required service and a required capability for the AF. The UDM has a function similar to that of the HSS, and may provide a related service and a related capability for the NEF. The AMF/SMF has a function similar to that of the MME/SGSN, and may provide a supported service and a supported capability for the NEF.

(2) Event Monitoring Procedure

Figure 3:
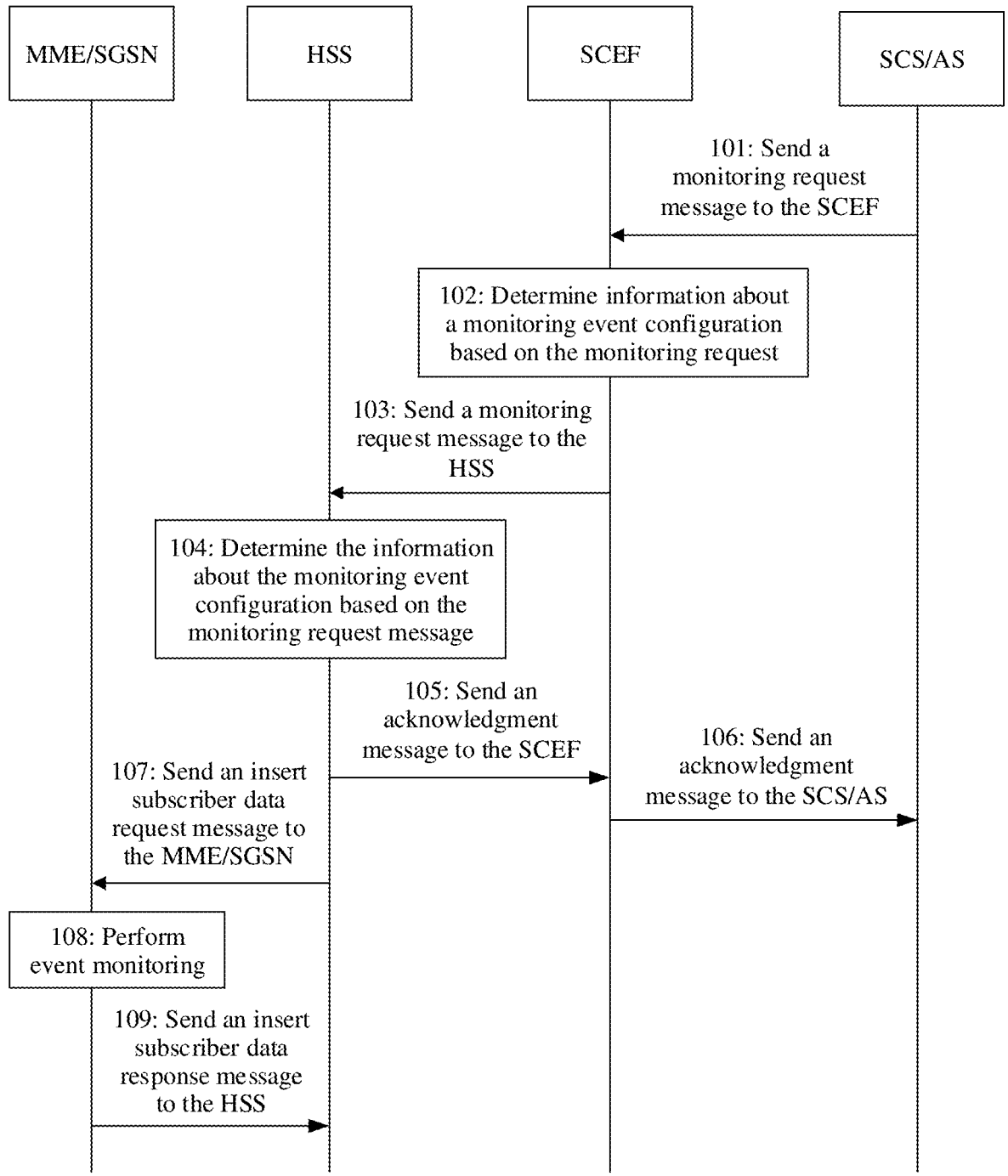
FIG. 3 is a schematic diagram of an example of a monitoring event configuration procedure.

The following separately describes in detail monitoring event configuration procedures and monitoring event monitoring procedures in the foregoing two service capability exposure architectures.

a. Monitoring Event Configuration (Monitoring Event Configuration) Procedure that is Based on the Service Capability Exposure Architecture in the 4G Network FIG. 3 is a schematic diagram of an example of a monitoring event configuration procedure. With reference to FIG. 3, details are as follows:

Step 101: An SCS/AS sends a monitoring request message to an SCEF.

Specifically, the SCS/AS sends the monitoring request message to the SCEF, to indicate the SCEF to configure event monitoring for a user group.

For example, the monitoring request message includes but is not limited to monitoring type (Monitoring Type) information, an external group identifier (External Group ID), a T8 long term transaction reference identifier (T8 Long Term Transaction Reference ID, TLTRI), identification information of the SCS/AS, and T8 destination address information.

Specifically, the monitoring type information may also be referred to as event monitoring type information, and indicates a type of event monitoring that needs to be performed on the user group. It may also be understood as that event monitoring of a specified type needs to be performed on the user group. Optionally, the monitoring request message may carry one or more pieces of event monitoring type information, where the event monitoring type information is used to indicate to monitor one or more specified types of monitoring events of the user group. For example, the event monitoring type may be loss of connectivity (Loss of connectivity) or user equipment reachability (UE reachability).

The external group ID is used to indicate the user group, and the SCS/AS and the SCEF may identify the corresponding user group based on the identifier. It should be noted that all user groups have been configured in advance, and the user group may include one or more users. A specific configuration process is not described in detail in this application.

The TLTRI is used to indicate a monitoring event configuration, and the SCS/AS and the SCEF may query for the corresponding monitoring event configuration based on the TLTRI.

It should be noted that a correspondence between a user, a user group, and a monitoring event configuration may be understood as follows: One user may belong to different user groups, a single user group may correspond to one or more monitoring event configurations, and each monitoring event configuration may correspond to one or more event monitoring types. An example is provided as follows: UE 1 belongs to a user group 1 and a user group 2. The user group 1 corresponds to a monitoring event configuration 1 (TLTRI 1), and the monitoring event configuration 1 is configured to monitor a loss of connectivity monitoring event of the user group 1, in other words, an event monitoring type of the monitoring event configuration 1 is loss of connectivity. The user group 1 further corresponds to a monitoring event configuration 2 (TLTRI 2), and the monitoring event configuration 2 is configured to monitor a UE reachability monitoring event of the user group 1, in other words, an event monitoring type of the monitoring event configuration 2 is UE reachability. The user group 2 corresponds to a monitoring event configuration 3 (TLTRI 3), and the monitoring event configuration 3 is configured to monitor a loss of connectivity monitoring event of the user group 2, in other words, an event monitoring type of the monitoring event configuration 3 is loss of connectivity.

Optionally, the monitoring request message may further include at least one of the following: a maximum quantity of reporting times and monitoring duration. For example, the monitoring duration is used to indicate a monitoring time length in which event monitoring is performed for the user group. In other words, when the monitoring duration expires, it may be determined that reporting of the monitoring event configuration is completed, and a network no longer performs monitoring for the corresponding monitoring event configuration. For example, the maximum quantity of reporting times is used to indicate a maximum quantity of times that each user in the monitoring event configuration can report a report. In other words, when a quantity of reporting times that is of each user in the user group and that corresponds to the monitoring event configuration reaches the maximum quantity of reporting times, it is determined that the reporting of the monitoring event configuration is completed, and monitoring is no longer performed for the monitoring event configuration. An example is provided as follows: The user group 1 includes three users. When a quantity of reporting times that is stored by the SCEF, that is of each user, and that corresponds to the specified monitoring event configuration reaches the maximum quantity of reporting times, it may be determined that reporting of the monitoring event configuration is completed. In addition, the maximum quantity of reporting times may be further used to indicate a maximum quantity of times that each user in the monitoring event configuration may report a report for each monitoring type. In other words, in a monitoring event configuration, when a quantity of reporting times that is of each user in a user group and that corresponds to each monitoring type reaches the maximum quantity of reporting times, it is determined that reporting of the monitoring event configuration is completed, and monitoring is no longer performed for the monitoring event configuration.

It should be noted that, as described above, a single user group may correspond to a plurality of monitoring event configurations. Therefore, the configuration parameters carried in the monitoring request message are valid only for the monitoring event configuration indicated this time.

It should be further noted that, if the monitoring request message carries neither the maximum quantity of reporting times nor the monitoring duration, it indicates that a monitoring request is a one-time monitoring request, or the monitoring request may be understood as a temporary monitoring request.

Step 102: The SCEF determines information about the monitoring event configuration based on the monitoring request.

Specifically, after receiving the monitoring request, the SCEF obtains and stores the parameters carried in the monitoring request. In addition, the SCEF authorizes the monitoring request based on the parameters. Authorization may be understood as confirmation of whether the monitoring request is valid, in other words, whether the monitoring request meets a policy and a subscription of an operator.

An SCEF reference ID is identification information allocated by the SCEF to the monitoring event configuration based on the TLTRI. The SCEF stores a correspondence between the SCEF reference ID and the TLTRI.

Step 103: The SCEF sends a monitoring request message to an HSS.

Specifically, the SCEF sends the monitoring request message to the HSS, to indicate the HSS to perform corresponding configuration on the monitoring event configuration. It may also be understood as that the HSS is indicated to determine the information about the monitoring event configuration.

For example, the monitoring request message includes but is not limited to the external group ID, identification information of the SCEF, the SCEF reference ID, and the monitoring type. Optionally, the monitoring request message may further include some or all parameters in the monitoring request message in step 101, for example, may include the identification information of the SCS/AS and the T8 destination address information. This is not limited in this application.

Step 104: The HSS determines the information about the monitoring event configuration based on the monitoring request message.

Specifically, the HSS receives the monitoring request message, and obtains the parameters carried in the monitoring request message. The HSS checks, based on the obtained parameters, whether the monitoring request message meets a network policy. After determining that the monitoring request message meets the network policy, the HSS stores the parameters in the monitoring request message, and creates the monitoring event configuration (in other words, determines the information about the monitoring event configuration).

Specifically, the HSS stores subscription information, and the HSS may perform matching on the subscription information based on the external group ID, to determine the corresponding user group and a group member included in the user group. For example, the HSS stores the subscription information, where the subscription information includes but is not limited to a correspondence between a user and a user group. The HSS may retrieve the corresponding user group based on the external group ID, and obtain a plurality of users in the user group. Specifically, the HSS obtains user identification information corresponding to each user, where the user identification information may be an external user identifier or a mobile subscriber international integrated services digital network number (Mobile Subscriber International ISDN number, MSISDN).

Optionally, the HSS further stores a correspondence between each user and an MME. Specifically, the architecture may include a plurality of MMEs, and MMEs corresponding to the users in the user group may be the same or may be different. This is not limited in this application.

Step 105: The HSS sends an acknowledgment message to the SCEF.

Specifically, the HSS sends the acknowledgment message to the SCEF, where the message carries the SCEF reference ID, accept indication information, and a quantity of group members in the user group or user identification information of the group member in the user group. The accept indication information is used to indicate that the HSS accepts the monitoring request message that is sent by the SCEF and that carries the SCEF reference ID. It may also be understood as that the HSS has completed event monitoring configuration corresponding to the SCEF reference ID.

Step 106: The SCEF sends an acknowledgment message to the SCS/AS.

Specifically, after receiving the acknowledgment message sent by the HSS, the SCEF creates the monitoring event configuration (in other words, determines the information about the monitoring event configuration). The information about the monitoring event configuration may include information about a monitoring event configuration of the user group and information about a monitoring event configuration of the group member user. The information about the monitoring event configuration of the user group includes the event monitoring type, the external group ID, the identification information of the SCS/AS, the T8 destination address information, the SCEF reference ID, and the TLTRI. The information about the monitoring event configuration of the group member user includes group member information (for example, the quantity of group members or a group member identifier list) of the user group and a quantity of reporting times of each group member user. The information about the monitoring event configuration of the user group further includes but is not limited to at least one of the following: the maximum quantity of reporting times, the monitoring duration, and the like.

Then, the SCEF sends the acknowledgment message to the SCS/AS. The message includes but is not limited to accept indication information and the TLTRI. The accept indication information is used to indicate that the SCEF has completed event monitoring configuration corresponding to the TLTRI.

Optionally, step 105 and step 106 may alternatively be performed after step 109. This is not limited in this application.

Step 107: The HSS sends an insert subscriber data request message to an MME/SGSN.

Specifically, as described in step 104, the HSS may obtain the user in the user group and the user identification information corresponding to the user. For each user, the HSS sends an insert subscriber data request (Insert Subscriber Data Request) message to an MME/SGSN corresponding to the user. In other words, for each user in the user group, the HSS repeats step 107 to step 109.

Specifically, for a single user, the HSS sends an insert subscriber data request message to an MME/SGSN corresponding to the user, where the insert subscriber data request message is used to indicate the MME/SGSN to perform event monitoring on the user. For example, the message includes but is not limited to the monitoring type, the identification information of the SCEF, the SCEF reference ID, the maximum quantity of reporting times and/or the monitoring duration, and an external identifier or an MSISDN of the user.

Step 108: The MME/SGSN performs event monitoring.

Specifically, the MME/SGSN receives the insert subscriber data request message sent by the HSS, and obtains the parameters carried in the insert subscriber data request message. For example, the MME/SGSN determines the information about the monitoring event configuration of the user, where the information includes the identification information of the SCEF, the SCEF reference ID, the monitoring type, the external identifier or the MSISDN of the user, and the maximum quantity of reporting times and/or the monitoring duration.

After the HSS requests, for each user in the user group, the MME/SGSN to perform event monitoring, each MME/SGSN may perform, based on the insert subscriber data request message, event monitoring on each user in the monitoring event configuration corresponding to the user group.

As described above, each user may correspond to a different user group, and each user group may correspond to a different monitoring event configuration. In other words, if different monitoring events need to be configured for the user group, step 101 to step 108 are repeatedly performed. In other words, different event monitoring of a same user group corresponds to different information about a monitoring event configuration, for example, corresponds to different TLTRIs and different SCEF reference IDs.

Step 109: The MME/SGSN sends an insert subscriber data response message to the HSS.

Specifically, after monitoring event configuration succeeds, the MME/SGSN sends the insert subscriber data response message to the HSS, where the message carries accept indication information, and the accept indication information is used to indicate that the MME/SGSN successfully performs monitoring event configuration.

Figure 4:
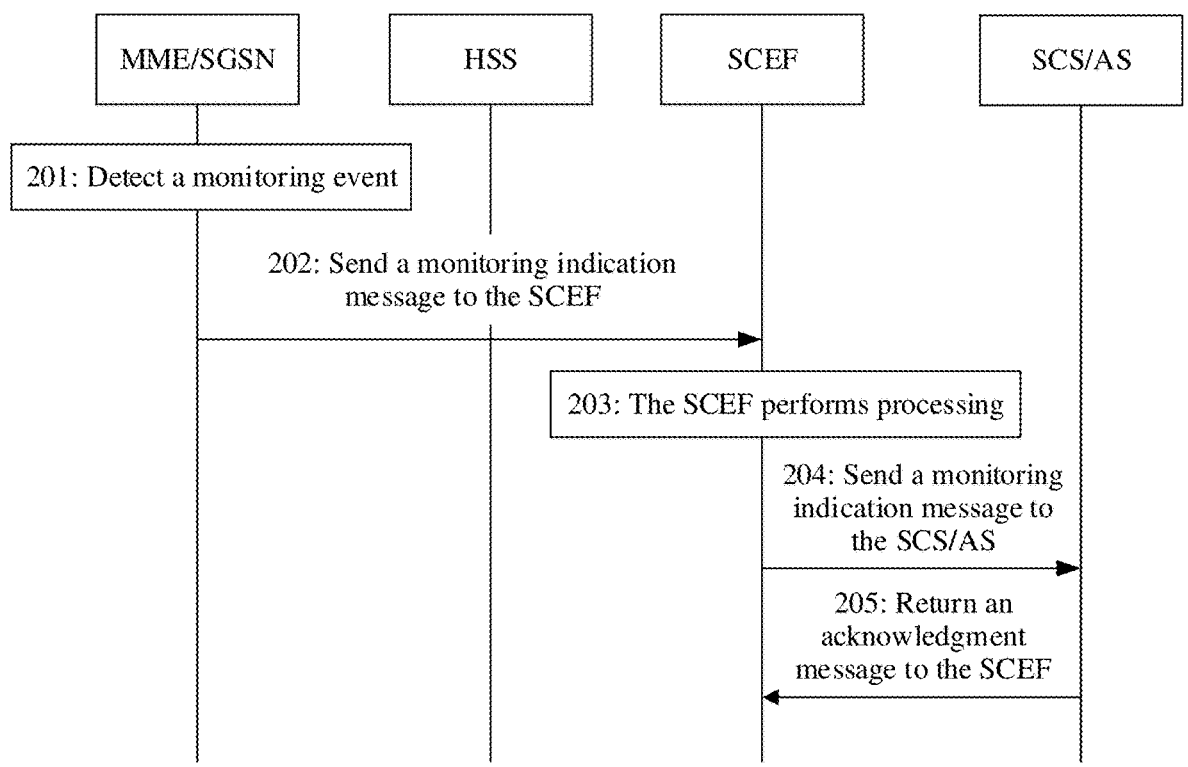
FIG. 4 is a schematic diagram of an example of a monitoring event monitoring procedure.

It should be noted that the HSS performs step 107 to step 109 for each user. Therefore, the insert subscriber data response message sent by the MME/SGSN may not carry the identification information of the user, and the HSS may learn that the currently received insert subscriber data response message is for the current user.

b. Monitoring Event Reporting Procedure that is Based on the Service Capability Exposure Architecture in the 4G Network FIG. 4 is a schematic diagram of an example of a monitoring event reporting procedure. With reference to FIG. 4, details are as follows:

Step 201: An MME/SGSN detects a monitoring event.

Specifically, as described above, the MME/SGSN performs event monitoring on a user in a monitoring event configuration. In this embodiment, the MME/SGSN detects the monitoring event of the user.

Step 202: The MME/SGSN sends a monitoring indication message to an SCEF.

Specifically, after detecting the monitoring event of the user, the MME/SGSN sends the monitoring indication message to the SCEF, to indicate that the monitoring event exists for the user.

For example, the message includes but is not limited to an SCEF reference ID, a monitoring event report, and identification information of the user, and is used to indicate that in the monitoring event configuration corresponding to the SCEF reference ID, the monitoring event exists for the user corresponding to the identification information of the user. The monitoring event report includes but is not limited to a type of the monitoring event.

An example is provided as follows: The MME/SGSN detects that a loss of connectivity monitoring event exists for a user 1, and the MME/SGSN sends a monitoring indication message to the SCEF. The message carries user identification information of the user 1, for example, an external user identifier of the user 1, and further carries an SCEF reference ID 1 corresponding to a monitoring event configuration 1 and a monitoring event report.

As described above, the MME/SGSN may store a quantity of remaining reporting times corresponding to the monitoring event configuration. To be specific, when monitoring event configuration succeeds, the quantity of remaining reporting times is set to a value of a maximum quantity of reporting times. If the MME/SGSN reports a monitoring event report once, the quantity of remaining reporting times is decreased by 1. For example, if the quantity of remaining reporting times is 0, the MME/SGSN deletes locally stored information about a monitoring event configuration of the user, in other words, the MME/SGSN stops performing event monitoring on the user in the monitoring event configuration.

In a possible implementation, if the monitoring event configuration indicates that the event monitoring is one-time event monitoring, after sending the monitoring indication message to the SCEF, the MME/SGSN deletes the information about the monitoring event configuration of the user.

Step 203: The SCEF performs processing.

Specifically, after receiving the monitoring indication message, the SCEF stores a quantity of event reporting times corresponding to the user.

In an example, if a quantity of event reporting times of each user in a user group reaches the maximum quantity of reporting times, the SCEF determines that reporting of the monitoring event configuration is completed, deletes the monitoring event configuration that corresponds to the user group and for which a maximum quantity of reporting times is reached, and indicates an HSS to delete the monitoring event configuration.

In another example, if a quantity of event reporting times, of each monitoring type, of each user in a user group reaches the maximum quantity of reporting times, the SCEF determines that reporting of the monitoring event configuration is completed, deletes the monitoring event configuration that corresponds to the user group and for which a maximum quantity of monitoring times is reached, and indicates an HSS to delete the monitoring event configuration.

Step 204: The SCEF sends a monitoring indication message to an SCS/AS.

Specifically, the SCEF sends the monitoring indication message to the SCS/AS, where the monitoring indication message is used to indicate that the monitoring event exists for the user.

For example, the message includes but is not limited to a TLTRI, the monitoring event report, and the identification information of the user. The TLTRI is found by the SCEF based on the SCEF reference ID.

Optionally, the SCEF may aggregate a plurality of event reports from the MME/SGSN. The SCEF may include an event report list in one monitoring indication message, where the list includes a correspondence between a TLTRI, a monitoring event report, and identification information of a user.

Step 205: The SCS/AS returns an acknowledgment message to the SCEF.

c. Monitoring Event Configuration Procedure that is Based on the Service Capability Exposure Architecture in the 5G Network, where in this Procedure, the Monitoring Event Configuration Procedure is Also Referred to as a Monitoring Event Subscription (Monitoring Event Subscription) Procedure, a Monitoring Request is Also Referred to as a Monitoring Event Subscription Request (Event Subscription Request), and Monitoring Type Information is Also Referred to as an Event Identifier (Event Id)

Figure 5:
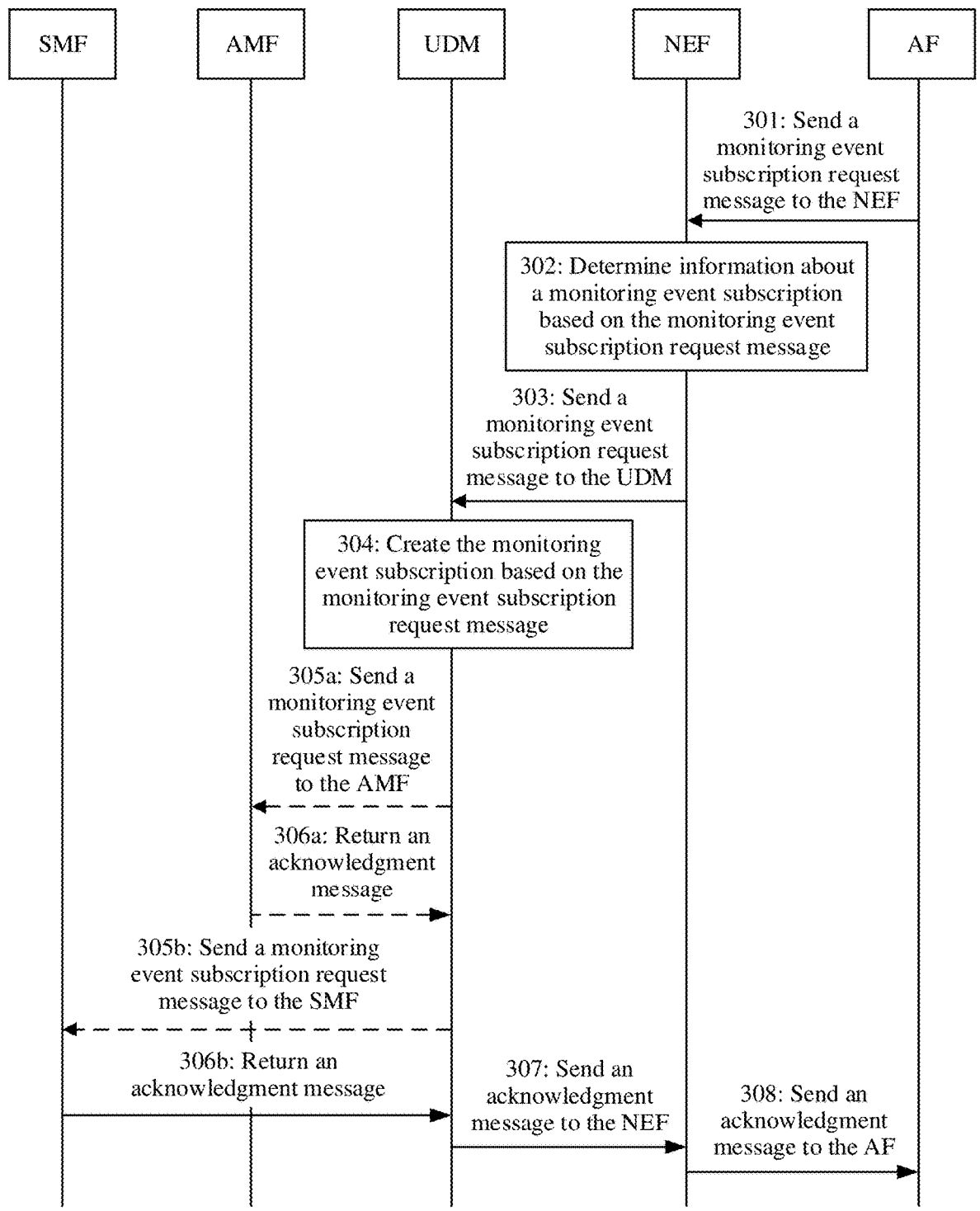
FIG. 5 is a schematic diagram of an example of a monitoring event configuration procedure.

FIG. 5 is a schematic diagram of an example of a monitoring event subscription procedure. With reference to FIG. 5, details are as follows:

Step 301: An AF sends a monitoring event subscription request message to a NEF.

Specifically, the AF sends the monitoring event subscription request message to the NEF, to indicate to configure a monitoring event for a user group (or referred to as to perform monitoring event subscription). For example, the monitoring event subscription request message includes but is not limited to an AF notification endpoint, an event identifier, and an external group ID.

The AF notification endpoint is identification information allocated by the AF to the monitoring event subscription. An event report subsequently sent by the NEF to the AF carries the notification endpoint, where the notification endpoint is used to correlate the event report with the monitoring event subscription. For example, the AF notification endpoint may be target notification address information, or target notification address information and notification correlation identification information.

Optionally, there may be one or more event identifiers carried in the message. In other words, a single monitoring event subscription may correspond to one or more event identifiers.

Optionally, the monitoring event subscription message may further carry a monitoring event reporting mode, and the monitoring event reporting mode is used to indicate a maximum quantity of reporting times of the monitoring event, a periodic reporting manner, monitoring duration, or the like.

For other details, refer to step 101. Details are not described herein.

Step 302: The NEF determines information about the monitoring event subscription based on the monitoring event subscription request message.

Specifically, the monitoring event subscription is authorized, and the parameters in the monitoring event subscription request message are stored.

Other details are similar to those in step 102, and are not described herein.

Step 303: The NEF sends a monitoring event subscription request message to a UDM.

Specifically, the NEF sends the monitoring event subscription request message to the UDM, to perform monitoring event subscription.

For example, the monitoring event subscription request message includes but is not limited to the external group ID, the event identifier, a NEF notification endpoint, and the like. Optionally, the message may further include some or all parameters in step 301. For details, refer to a current technology. This is not limited in this application.

The NEF notification endpoint is identification information allocated by the NEF to the monitoring event subscription. An event report subsequently sent to the NEF carries the notification endpoint, where the notification endpoint is used to correlate the event report with the monitoring event subscription.

Step 304: The UDM creates the monitoring event subscription based on the monitoring event subscription request message.

Specifically, the UDM checks whether the monitoring event subscription request message sent by the NEF meets a network policy, and after determining that the monitoring event subscription request message meets the network policy, stores the parameters in the monitoring event subscription request message, to create the monitoring event subscription. It may also be understood as determining the information about the monitoring event subscription. The information about the monitoring event subscription is the stored parameters, including but not limited to the external group ID, the event identifier, the NEF notification endpoint, and the like.

For example, the UDM may find, based on locally stored subscription information, an internal group identifier corresponding to the external group ID, and find, based on the internal group identifier, a corresponding group member and an external identifier or MSISDN of each group member user. In addition, the UDM determines an AMF or an SMF that is serving a user in the user group, and the UDM performs step 305*a* or step 305*b* for each AMF or SMF that serves the user in the user group.

Step 305*a*: The UDM sends a monitoring event subscription request message to the AMF.

Specifically, the UDM sends the monitoring event subscription request message to the AMF, to indicate the AMF to perform event monitoring on the member user in the user group.

For example, the message may include the NEF notification endpoint, information about the internal group identifier, and the event identifier. The message may further include some optional parameters in step 301. For details, refer to the current technology. This is not limited in this application.

Step 306*a*: The AMF returns an acknowledgment message.

Specifically, the AMF determines the information about the monitoring event subscription based on the parameters in the monitoring event subscription request message. The information about the monitoring event subscription may include information about a monitoring event subscription of the user group and information about a monitoring event subscription of each group member user.

For example, the information about the monitoring event subscription of the user group includes an AMF subscription correlation identifier, the NEF notification endpoint, an event monitoring mode, event monitoring type information, and the like. The information about the monitoring event subscription of the group member user includes a quantity of remaining reporting times (where an initial value is set based on the maximum quantity of reporting times) and the like.

Optionally, the information about the monitoring event subscription of the user group may be written into a context of the user group, and the information about the monitoring event subscription of the user may be written into a context of the user.

It should be noted that a correspondence between a user and a user group has been pre-stored in each network element.

The AMF performs event monitoring on the user based on the information about the monitoring event subscription, and sends the acknowledgment message to the UDM. The message includes the AMF subscription correlation identifier. Correspondingly, the UDM writes the AMF subscription correlation identifier into the information about the monitoring event subscription.

Step 305*b*: The UDM sends a monitoring event subscription request message to the SMF.

Step 305*b* is similar to step 305*a*. Details are not described herein.

Step 306*b*: The SMF returns an acknowledgment message.

Specifically, the SMF determines the information about the monitoring event subscription based on the parameters in the monitoring event subscription request message.

For example, the information about the monitoring event subscription includes but is not limited to an event monitoring mode, an SMF subscription correlation identifier, the NEF notification endpoint, event monitoring type information, and the like. The SMF subscription correlation identifier is an identifier allocated by the SMF to the monitoring event subscription.

The SMF performs event monitoring on the user and sends the acknowledgment message to the UDM. The message includes the SMF subscription correlation identifier. Correspondingly, the UDM writes the SMF subscription correlation identifier into the information about a monitoring event subscription of the user.

Other details are similar to those in step 306*a*, and are not described herein.

Step 307: The UDM sends an acknowledgment message to the NEF.

For example, after determining that monitoring event subscription has been completed for all AMFs or SMFs serving the user group, the UDM sends the acknowledgment message to the NEF. The acknowledgment message includes but is not limited to accept indication information, a UDM subscription correlation identifier, and a quantity of member users in the user group or a group member user identifier list.

For other details, refer to step 105. Details are not described herein.

Step 308: The NEF sends an acknowledgment message to an AF.

Specifically, after receiving the acknowledgment message sent by the UDM, the NEF determines the information about the monitoring event subscription based on the acknowledgment message. The information about the monitoring event subscription may include but is not limited to: the information about the monitoring event subscription of the user group and the information about the monitoring event subscription of the member user. For example, the information about the monitoring event subscription of the user group includes the AF notification endpoint, the event identifier, the external group ID, the NEF notification endpoint, the UDM subscription correlation identifier, and the event monitoring reporting mode; the information about the monitoring event subscription of the group member user includes group member information (for example, the quantity of group members or the group member identifier list) and a quantity of reporting times of each group member user. The information about the monitoring event subscription of the user group further includes but is not limited to at least one of the following: the maximum quantity of reporting times, the monitoring duration, and the like.

Figure 6:
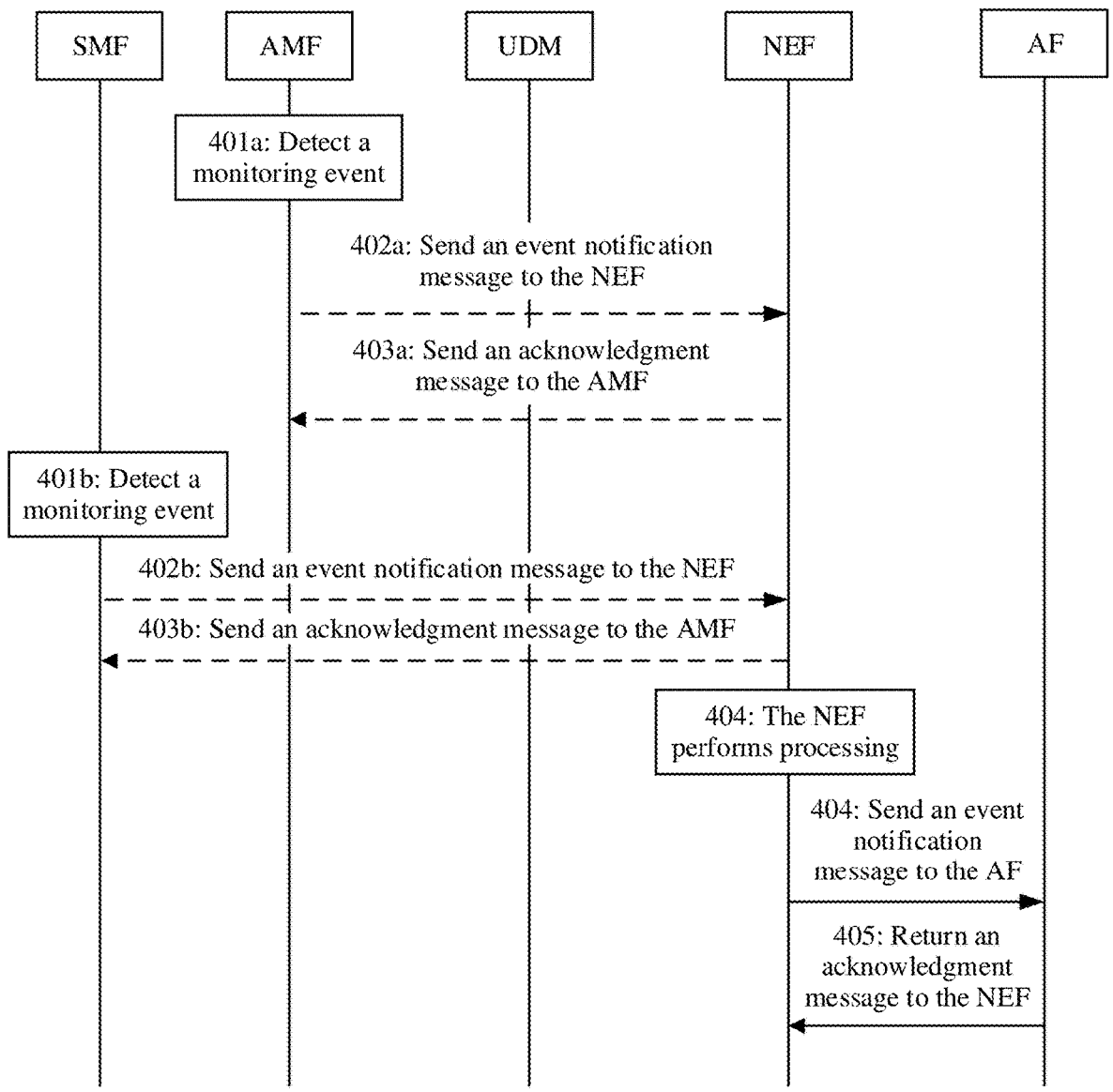
FIG. 6 is a schematic diagram of an example of a monitoring event monitoring procedure.

For example, the NEF sends the acknowledgment message to the SCS/AS, to indicate that the NEF completes the monitoring event subscription, where the message carries accept indication information and the NEF subscription correlation identifier.

d. Monitoring Event Reporting Procedure that is Based on the Service Capability Exposure Architecture in the 5G Network FIG. 6 is a schematic diagram of an example of an event monitoring procedure. With reference to FIG. 6, details are as follows:

Step 401a: An AMF detects a monitoring event.

Specific details are similar to those in step 201, and are not described herein.

Step 402a: The AMF sends an event notification message to a NEF.

Specifically, after detecting the monitoring event, the AMF sends the event notification message to the NEF. The message includes a NEF notification endpoint, a monitoring event report, and external identification information of a user. In addition, the AMF decreases a quantity of remaining reporting times in information about a monitoring event subscription of the user by 1.

Other details are similar to those in step 202, and are not described herein.

Step 403a: The NEF sends an acknowledgment message to the AMF.

Specifically, the NEF sends the acknowledgment message to the AMF, to indicate that the event notification message sent by the AMF is received.

Step 401b: An SMF detects a monitoring event.

Specific details are similar to those in step 201, and are not described herein.

Step 402b: The SMF sends an event notification message to the NEF.

Specifically, after detecting the monitoring event, the SMF sends the event notification message to the NEF. The message includes the NEF notification endpoint, a monitoring event report, and external identification information of a user. In addition, the SMF decreases a quantity of remaining reporting times in information about a monitoring event subscription of the user by 1.

Other details are similar to those in step 202, and are not described herein.

Step 403b: The NEF sends an acknowledgment message to the SMF.

Specifically, the NEF sends the acknowledgment message to the SMF, to indicate that the event notification message sent by the SMF is received.

Step 404: The NEF performs processing.

Specifically, after receiving the event notification message from the AMF or the SMF, the NEF stores a quantity of event reporting times corresponding to the user.

In an example, if a quantity of event reporting times of each user in a user group corresponding to the monitoring event subscription reaches a maximum quantity of reporting times, the NEF determines that reporting of the monitoring event subscription is completed, deletes the monitoring event subscription, and indicates the UDM to delete the monitoring event subscription.

In another example, if a quantity of event reporting times, of each event identifier, of each user in a user group reaches a maximum quantity of reporting times, the NEF determines that reporting of the monitoring event subscription is completed, deletes the monitoring event subscription, and indicates the UDM to delete the monitoring event subscription.

Step 405: The NEF sends an event notification message to an AF.

Specifically, the NEF sends the event notification message to the AF, to indicate that the monitoring event exists for the user. The message carries an AF notification endpoint, the monitoring event report, and the external identification information of the user.

For other details, refer to step 204. Details are not described herein.

Step 406: The AF returns an acknowledgment message to the NEF.

(3) Event Monitoring Management

Figure 7:
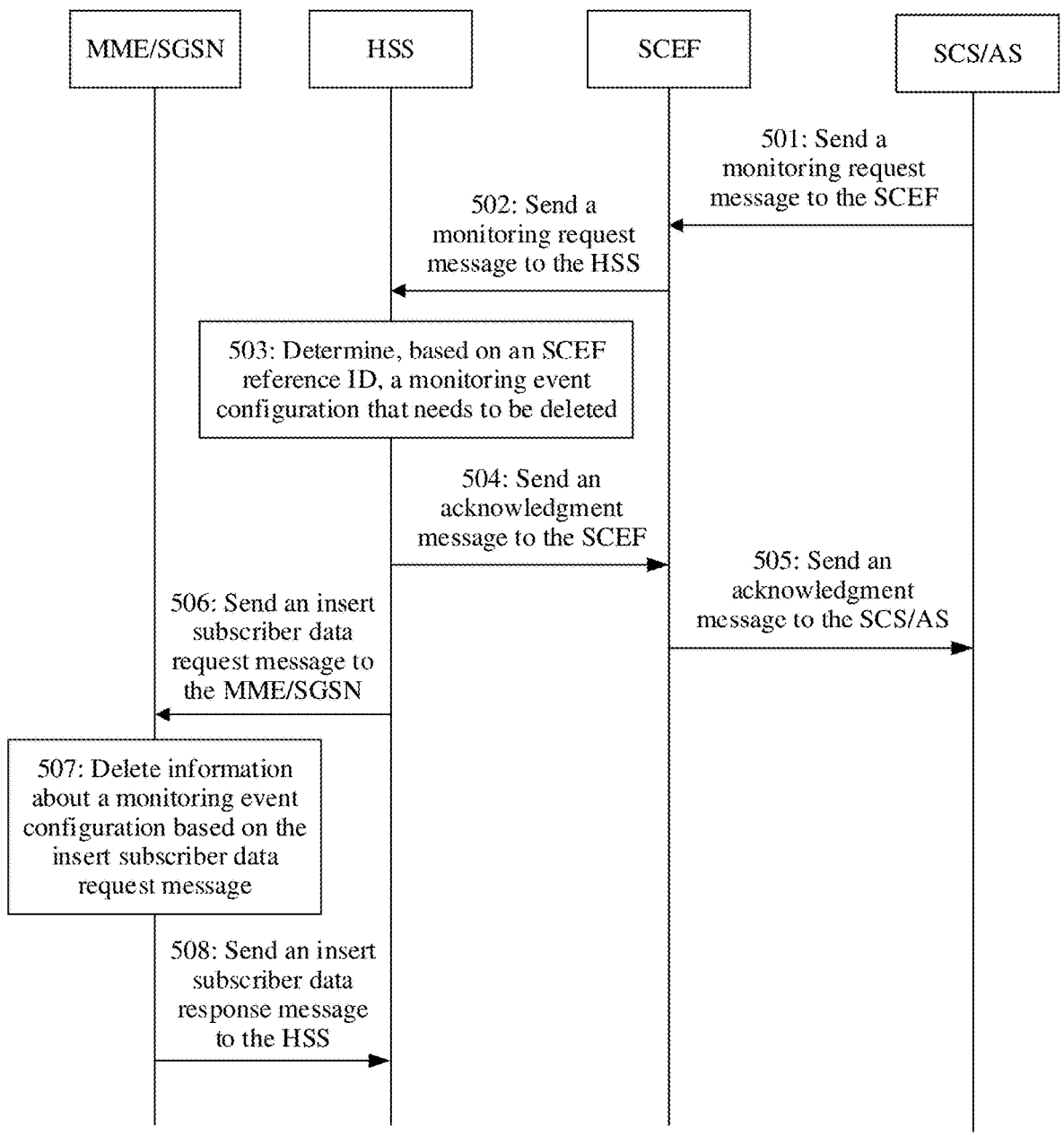
FIG. 7 is a schematic diagram of an example of a monitoring event management procedure.

The following separately describes in detail monitoring event configuration management methods in 4G and 5G service capability exposure architectures.

a. Monitoring Event Configuration Management Procedure that is Based on the Service Capability Exposure Architecture in the 4G Network FIG. 7 is a schematic diagram of an example of an event monitoring management procedure. With reference to FIG. 7, details are as follows:

Step 501: An SCS/AS sends a monitoring request message to an SCEF.

Specifically, the SCS/AS sends the monitoring request message to the SCEF (where the message carries a TLTRI and deletion indication information), to indicate to cancel (delete) a monitoring event configuration corresponding to the TLTRI. It may also be understood as that the monitoring event configuration corresponding to the TLTRI in one or more monitoring event configurations corresponding to a user group is deleted, in other words, monitoring is no longer performed on the user group for the monitoring event configuration.

Step 502: The SCEF sends a monitoring request message to an HSS.

Specifically, the SCEF may determine a corresponding SCEF reference ID based on the TLTRI, and the SCEF sends the monitoring request message to the HSS, where the message carries the SCEF reference ID and deletion indication information.

Step 503: The HSS determines, based on the SCEF reference ID, the monitoring event configuration that needs to be deleted.

Specifically, as described above, the HSS stores information about the one or more monitoring event configurations. The HSS may find information about the corresponding monitoring event configuration based on the SCEF reference ID, and obtain a corresponding user in the user group.

Step 504: The HSS sends an acknowledgment message to the SCEF.

Specifically, the HSS sends the acknowledgment message to the SCEF, to indicate that the monitoring request message sent by the SCEF is received.

Step 505: The SCEF sends an acknowledgment message to the SCS/AS.

Specifically, the SCEF sends the acknowledgment message to the SCS/AS, to indicate that the monitoring request message sent by the SCS/AS is received.

Step 506: The HSS sends an insert subscriber data request message to an MME/SGSN.

Specifically, after determining the user corresponding to the monitoring event configuration, the HSS repeatedly performs step 506 for each user. The insert subscriber data request message includes but is not limited to the SCEF reference ID, identification information of the user (for example, external identification information of the user), and deletion indication information.

Step 507: The MME/SGSN deletes information about a monitoring event configuration based on the insert subscriber data request message.

Specifically, the MME/SGSN determines the monitoring event configuration based on the SCEF reference ID in the insert subscriber data request message, and deletes, from the monitoring event configuration, the monitoring event configuration of the user corresponding to the identification information of the user.

Step 508: The MME/SGSN sends an insert subscriber data response message to the HSS.

After performing the operation of deleting the monitoring event configuration for the user, the MME/SGSN sends the insert subscriber data response message to the HSS, to indicate that the deletion operation corresponding to the user is completed.

Figure 8:
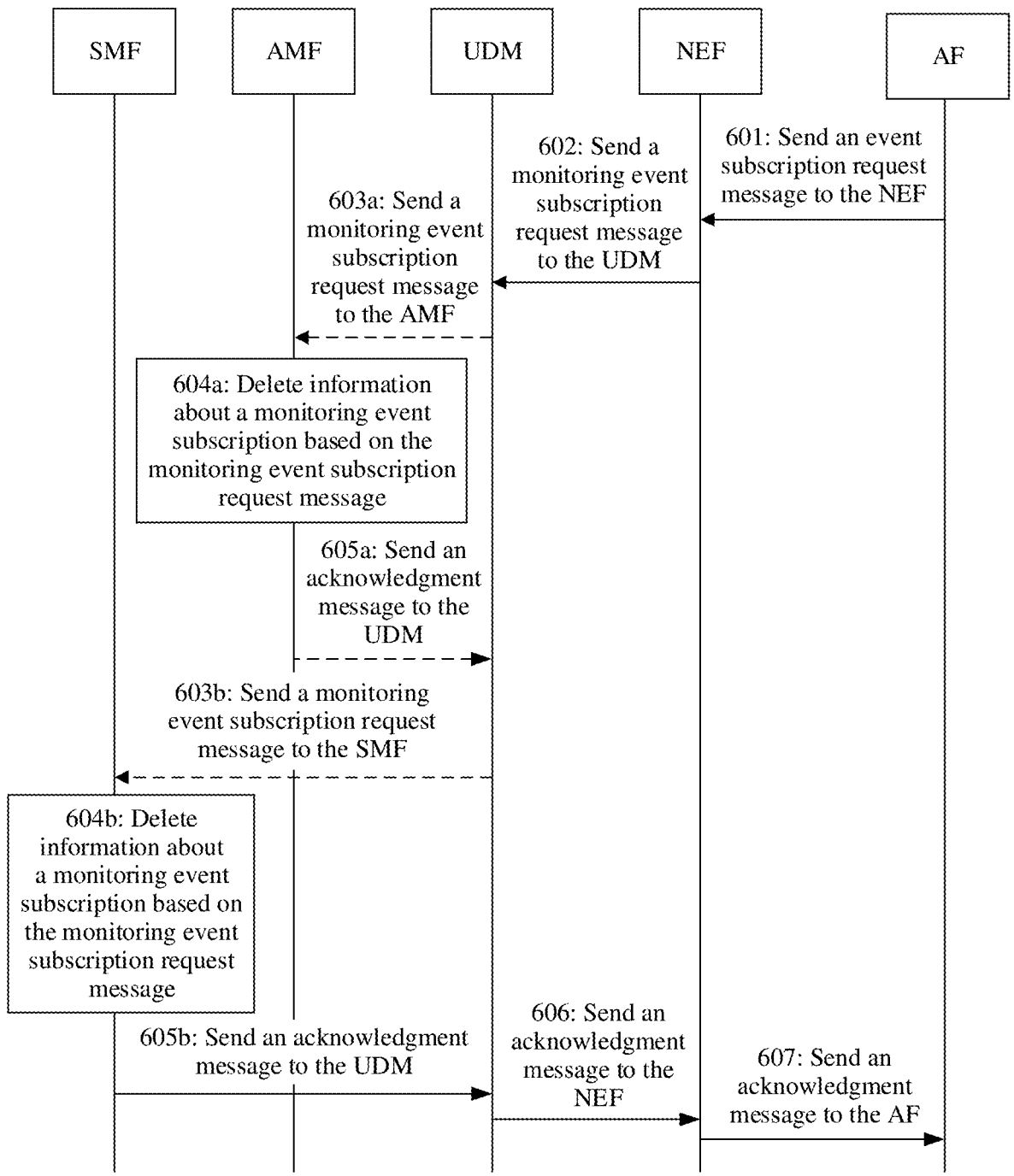
FIG. 8 is a schematic diagram of an example of a monitoring event management procedure.

The HSS repeatedly performs step 506 to step 508 for another user in the monitoring event configuration, until an operation of deleting a monitoring event configuration is completed for all users corresponding to the monitoring event configuration.

b. Monitoring Event Subscription Management Procedure that is Based on the Service Capability Exposure Architecture in the 5G Network FIG. 8 is a schematic diagram of an example of an event monitoring management procedure. With reference to FIG. 8, details are as follows:

Step 601: An AF sends an event subscription request message to a NEF.

Specifically, the AF sends the monitoring event subscription request message to the NEF, where the message carries a NEF subscription correlation identifier and deletion indication information.

Step 602: The NEF sends a monitoring event subscription request message to a UDM.

Specifically, the NEF may determine a corresponding UDM subscription correlation identifier based on the NEF subscription correlation identifier, and the NEF sends the monitoring event subscription request message, where the message carries the UDM subscription correlation identifier and deletion indication information.

Step 603*a*: The UDM sends a monitoring event subscription request message to an AMF.

as described above, the UDM stores information about a monitoring event subscription, and the UDM may find information about a corresponding monitoring event subscription based on the UDM subscription correlation identifier, and obtain a corresponding AMF subscription correlation identifier or SMF subscription correlation identifier. Step 603*a* to step 605*a* are performed for each AMF, and step 603*b* to step 605*b* are performed for each SMF.

the UDM sends the monitoring event subscription request message to the AMF, where the message includes the AMF subscription correlation identifier and deletion indication information.

Step 604*a*: The AMF deletes the information about the monitoring event subscription based on the monitoring event subscription request message.

the AMF determines the monitoring event subscription based on the AMF subscription correlation identifier in the monitoring event subscription request message, and deletes the monitoring event subscription.

Step 605*a*: The AMF sends an acknowledgment message to the UDM.

Step 603*b*: The UDM sends a monitoring event subscription request message to an SMF.

the UDM sends the monitoring event subscription request message to the SMF, where the message includes the SMF subscription correlation identifier and deletion indication information.

Step 604*b*: The SMF deletes the information about the monitoring event subscription based on the monitoring event subscription request message.

The SMF determines the monitoring event subscription based on the SMF subscription correlation identifier in the monitoring event subscription request message, and deletes the information about the monitoring event subscription.

Step 605*b*: The SMF sends an acknowledgment message to the UDM.

Step 606: The UDM sends an acknowledgment message to the NEF.

After determining that all AMFs/SMFs corresponding to the monitoring event subscription delete the monitoring event subscription, the UDM deletes the monitoring event subscription, and sends the acknowledgment message to the NEF, where the message carries UDM accept indication information.

Step 607: The NEF sends an acknowledgment message to the AF.

The NEF deletes the monitoring event subscription, and sends the acknowledgment message to the AF, where the message carries accept indication information.

It can be learned from the foregoing descriptions that in the current technology, monitoring event configuration (also referred to as monitoring event subscription in 5G) management is performed for a user group. For example, if a monitoring event configuration needs to be deleted, monitoring event configurations of all users in a user group corresponding to the monitoring event configuration need to be deleted. In addition, in the current technology, a user cannot be added to or deleted from the user group corresponding to the monitoring event configuration, in other words, event monitoring management cannot be performed at a granularity of a user in the current technology.

This application provides an event monitoring management method, to overcome a disadvantage in the current technology. The event monitoring management method in this application can be applied to a 4G network and a 5G network. The following describes in detail the monitoring management method in this application with reference to different application scenarios. In this application, an operation of canceling a monitoring event configuration for a user and a manner of managing user addition and user deletion in a user group may be implemented. A scenario 1 shows a specific embodiment of canceling a monitoring event configuration of a user in the 4G network, a scenario 2 shows a specific embodiment of adding a user to or deleting a user from a user group in the 4G network, a scenario 3 shows a specific embodiment of canceling a monitoring event configuration of a user in the 5G network, and a scenario 4 shows a specific embodiment of adding or deleting a monitoring event configuration of a user in the 5G network.

Scenario 1

Figure 9:
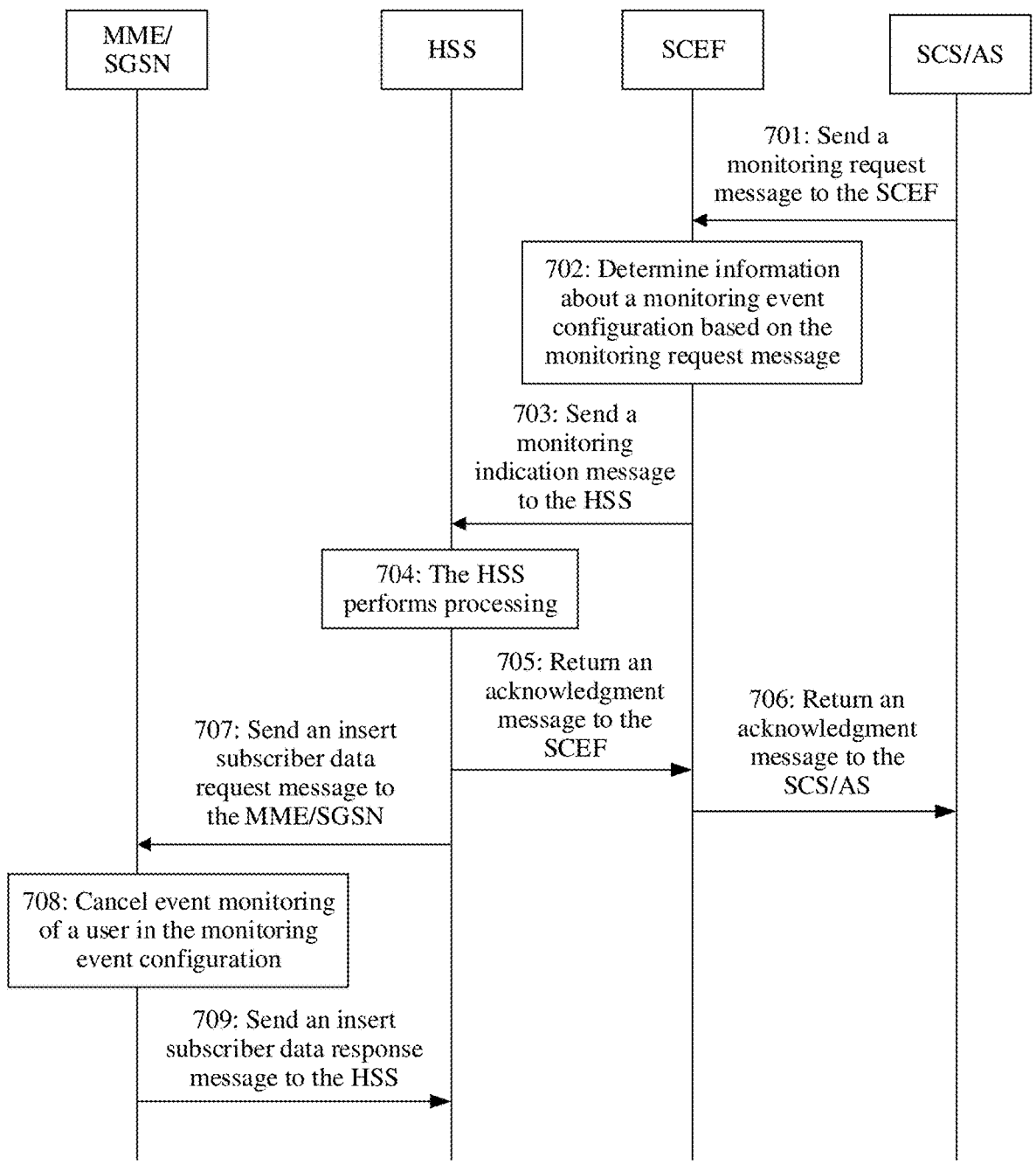
FIG. 9 is a schematic flowchart of an event monitoring management method according to an embodiment of this application.

With reference to FIG. 1, FIG. 9 is a schematic flowchart of an event monitoring management method according to an embodiment of this application. Details in FIG. 9 are described as follows:

For an event monitoring configuration procedure and an event monitoring monitoring procedure, refer to the embodiments shown in FIG. 3 and FIG. 4. Details are not described herein.

Step 701: An SCS/AS sends a monitoring request message to an SCEF.

The SCS/AS sends the monitoring request message to the SCEF, to indicate to cancel event monitoring of a user in a monitoring event configuration.

For example, the message includes but is not limited to identification information of the monitoring event configuration, identification information of the user, and cancellation indication information.

The identification information of the monitoring event configuration is used to indicate the corresponding monitoring event configuration. For example, the identification information of the monitoring event configuration may be a TLTRI.

The identification information of the user is used to identify the corresponding user. For example, the identification information of the user may be external identification information or an MSISDN of the user.

The cancellation indication information is used to indicate to cancel event monitoring of a specified user in a specified monitoring event configuration. It should be noted that the specified monitoring event configuration is the monitoring event configuration identified by the identification information of the monitoring event configuration, and the specified user is one or more users in a user group corresponding to the monitoring event configuration, that is, the user corresponding to the identification information of the user. Optionally, the monitoring request message may carry identification information of one or more users. In other words, the SCS/AS may indicate to cancel event monitoring of the one or more users in the specified monitoring event configuration.

In a possible implementation, the monitoring request message may further include one or more pieces of event monitoring type information. As described above, in a monitoring event configuration process, a single monitoring event configuration may correspond to one or more event monitoring types. In this application, the SCS/AS may indicate to cancel event monitoring, corresponding to one or more event monitoring types, of the specified user in the monitoring event configuration.

For example, a user 1 belongs to a user group 1, the user group 1 corresponds to a monitoring event configuration 1 and a monitoring event configuration 2, and the monitoring event configuration 1 corresponds to a monitoring event type 1 and a monitoring event type 2. For example, the SCS/AS may indicate to cancel event monitoring that corresponds to the event monitoring type 1 and that corresponds to the user 1 in the monitoring event configuration 1. In other words, only monitoring, of a specified event monitoring type, of the user 1 in the monitoring event configuration 1 is stopped (or canceled), and monitoring continues to be performed for another monitoring event configuration of the user 1. For example, the monitoring request message sent by the SCS/AS to the SCEF includes identification information (for example, a TLTRI 1) of the monitoring event configuration 1, identification information of the user 1, the event monitoring type 1, and cancellation indication information.

Step 702: The SCEF determines information about the monitoring event configuration based on the monitoring request message.

The SCEF receives the monitoring request message sent by the SCS/AS, obtains the parameters carried in the monitoring request message, and updates information about the monitoring event configuration based on the obtained parameters. An objective of updating the monitoring event configuration in this step is to remove a report of the user (which is a user whose monitoring needs to be canceled) when statistics about a report of a member user in the user group corresponding to the monitoring event configuration are collected.

The SCEF may query for the information about the corresponding monitoring event configuration based on the identification information of the monitoring event configuration. As described above, the information about the monitoring event configuration includes but is not limited to at least one of the following: a quantity of group members in the user group or a group member user identifier list, a quantity of reporting times of each member user, a maximum quantity of reporting times, identification information of the user group, the identification information of the monitoring event configuration, and the like.

When the quantity of event reporting times of each user in the user group corresponding to the monitoring event configuration reaches the maximum quantity of reporting times (that is, monitoring types are not distinguished), indicating that reporting of the monitoring event configuration is completed (that is, the maximum quantity of reporting times is at a granularity of each user), in this application, to remove the report of the user, the information about the monitoring event configuration may be updated in at least one of the following manners.

Manner 1: The SCEF records the identification information of the user and mark information, where the mark information is used to indicate that the user is a to-be-removed user.

Manner 2: The SCEF sets a quantity of reporting times of the user to the maximum quantity of reporting times, in other words, the SCEF considers by default that reporting of the user is completed.

Manner 3: The SCEF subtracts a quantity of users that need to be removed from the quantity of group members in the user group corresponding to the monitoring event configuration.

Manner 4: The SCEF deletes the user from the stored user identifier list of the user group, where a prerequisite for implementing this manner is that the SCEF stores the user identifier list of the user group.

Manner 5: The SCEF deletes the received report of the user, and subtracts a quantity of users that need to be removed from the quantity of group members in the corresponding user group.

Manner 6: The SCEF deletes the received report of the user, and records the identification information of the user and mark information.

Manner 7: The SCEF deletes the received report of the user, and deletes the user from the stored user list of the user group.

It should be noted that a prerequisite for performing the manner 5 to the manner 7 is that the report of the user has been received.

The following describes the foregoing several manners.

For the manner 1: the updated information about the monitoring event configuration includes a correspondence between the identification information of the user and the mark information. For example, the mark information may be written into information about a monitoring event configuration of the user. When the statistics about the report of the user group of the monitoring event configuration are collected, the SCEF may determine, based on the mark information, to ignore (or remove) the report of the user in the monitoring event configuration.

For the manner 2: The quantity of reporting times of the to-be-canceled user is set to the maximum quantity of reporting times, in other words, the SCEF considers by default that the reporting of the user is completed.

For the manner 3: As described above, when detecting whether the reporting of the monitoring event configuration is completed, the SCEF collects statistics on whether a quantity of users whose quantities of reporting times reach the maximum quantity of reporting times is equal to the quantity of group members in the user group corresponding to the monitoring event configuration. In this manner, the SCEF subtracts the quantity of users that need to be removed from the quantity of group members in the user group, so that during statistics collection, the SCEF only needs to detect whether a quantity of users whose quantities of reporting times reach the maximum quantity of reporting times is equal to an updated quantity of group members in the user group. For example, if a quantity of group members in a user group 1 corresponding to a monitoring event configuration 1 is 3, and the SCEF determines, based on an indication, that event monitoring of a user 1 in the monitoring event configuration 1 needs to be canceled, the SCEF may update the quantity of group members in the user group 1 corresponding to the monitoring event configuration 1 to 2. In other words, provided that it is learned through statistics collection that quantities of reporting times of two users reach a maximum quantity of monitoring times, it may be determined that reporting of the monitoring event configuration 1 is completed.

For the manner 4: As described above, the SCEF stores the user identifier list of the user group. In this manner, the SCEF deletes the user from the user identifier list, so that when collecting statistics on monitoring event reports of the user group, the SCEF collects statistics on only a quantity of monitoring event reporting times of a user identified in the user identifier list, to remove the user.

For the manner 5 to the manner 7: On the SCEF, the information about the monitoring event configuration of the user may further include the reported report, and the SCEF deletes the report of the user from the monitoring event configuration. In addition, the manner 1, the manner 3, and the manner 4 may be combined with the manner 5 to the manner 7 to remove the user.

In a possible implementation, the manner 3 may be further combined with the manner 1 to prevent a statistics collection error caused by a signal transmission delay. After performing processing, the SCEF indicates an MME/SGSN to cancel the event monitoring of the user. Correspondingly, the MME no longer reports a report of the user. However, due to a signal delay, a limitation on a device processing capability, or a time error, the MME may report the report of the user before receiving an indication from the SCEF. In this case, an error occurs when the SCEF collects statistics on reports. Therefore, the SCEF may mark the user with reference to the manner 3 and the manner 1, and update the quantity of group members in the user group.

In conclusion, the updated information about the monitoring event configuration may be used to indicate the SCEF to remove the report of the user when collecting statistics on the report of the monitoring event configuration. As described above, when collecting statistics on whether the reporting of the monitoring event configuration is completed, the SCEF performs statistics collection based on whether reports of the maximum quantity of reporting times of all users corresponding to the monitoring event configuration are received. In this application, if monitoring of a user in the monitoring event configuration is canceled, the SCEF ignores a report of the user when collecting statistics on a report of event monitoring. In other words, the SCEF collects statistics on only a report of a user other than the user.

It should be noted that if the SCS/AS requests to cancel partial event monitoring of the user, in other words, the monitoring request message in step 701 carries the event monitoring type information, the SCEF does not need to perform the foregoing step. In other words, after receiving the monitoring request message, the SCEF performs step 703.

When a quantity of event reporting times, of each monitoring type, of each user in the user group corresponding to the monitoring event configuration reaches the maximum quantity of reporting times (that is, monitoring types are distinguished), indicating that reporting of the monitoring event configuration is completed (that is, the maximum quantity of reporting times is at a granularity of each user and each monitoring type), in this application, if the monitoring request message further includes the one or more pieces of event monitoring type information, to remove the report of the user, the information about the monitoring event configuration may be updated in at least one of the following manners.

Manner 1: The SCEF records the identification information of the user, the monitoring type information, and mark information, where the mark information is used to indicate that the user is a to-be-removed user, and the monitoring type information indicates a monitoring type for which removal needs to be performed.

Manner 2: The SCEF sets a quantity of reporting times, of each monitoring type, of the user to the maximum quantity of reporting times, in other words, the SCEF considers by default that reporting of the user is completed.

In conclusion, the updated information about the monitoring event configuration may be used to indicate the SCEF to remove, when collecting statistics on reports of the monitoring event configuration, a report that is of the user and that is of the monitoring event type for which cancellation needs to be performed. As described above, when collecting statistics on whether the reporting of the monitoring event configuration is completed, the SCEF performs statistics collection based on whether reports of the maximum quantity of reporting times of all users corresponding to the monitoring event configuration are received. In this application, if monitoring that is of the user and that is of the monitoring event type for which cancellation needs to be performed in the monitoring event configuration is canceled, the SCEF ignores a report, of the specific monitoring event type, of the user when collecting statistics on a report of event monitoring. In other words, the SCEF collects statistics on only a report of a user other than the user and a report, of the user, other than the report of the specific monitoring event type.

It should be noted that, if the SCEF determines, after updating the information about the monitoring event configuration, that event reporting of the monitoring event configuration is completed, the SCEF immediately sends monitoring request indication information to an HSS. The message carries an SCEF reference ID and deletion indication information. The HSS determines, based on the SCEF reference ID, the monitoring event configuration that needs to be deleted. Alternatively, after receiving a subsequent monitoring event report, the SCEF determines that event reporting of the monitoring event configuration is completed, and sends monitoring request indication information to an HSS, to request to delete the monitoring event report.

Step 703: The SCEF sends a monitoring indication message to the HSS.

The SCEF sends a monitoring request message to the HSS, where the monitoring request message includes the identification information of the monitoring event configuration, the identification information of the user, and cancellation indication information.

For example, the identification information of the monitoring event configuration in the monitoring request message may be the SCEF reference ID. The SCEF may determine the corresponding SCEF reference ID based on the TLTRI, include the SCEF reference ID in the monitoring request message, and send the monitoring request message to the HSS.

Optionally, the monitoring request message may further carry the one or more pieces of event monitoring type information, where the event monitoring type information is used to indicate to cancel the event monitoring, of the specified type, of the user in the monitoring event configuration.

Optionally, the monitoring request message may further carry validity indication information, where the validity indication information is used to indicate that the cancellation operation is always valid. In other words, after the monitoring event configuration is deleted, the cancellation operation is still valid. After the SCS/AS subsequently performs monitoring event configuration again for the user group, the HSS removes the user based on the validity indication information when sending member user information of the user group to the SCEF, and indicates the MME/SGSN not to perform event monitoring on the user. For example, the validity indication information may include at least one of the following: the identification information of the user, the event monitoring type, and identification information of the SCS/AS.

Step 704: The HSS performs processing.

After receiving the monitoring indication message, the HSS stores the parameters carried in the monitoring indication message. In addition, the HSS searches for the MME/SGSN corresponding to the user based on the identification information of the user.

Step 705: The HSS returns an acknowledgment message to the SCEF.

The HSS sends the acknowledgment message to the SCEF (where the message may include accept indication information), to indicate that the HSS has accepted the monitoring indication message sent by the SCEF.

Step 706: The SCEF returns an acknowledgment message to the SCS/AS.

The SCEF sends the acknowledgment message to the SCS/AS (where the message may include accept indication information), to indicate that the SCEF has accepted the monitoring indication message sent by the SCS/AS.

Step 707: The HSS sends an insert subscriber data request message to the MME/SGSN.

After finding the MME/SGSN corresponding to the user, the HSS sends the insert subscriber request message to the MME/SGSN, where the message includes but is not limited to identification information of the user, the identification information of the monitoring event configuration, and cancellation indication information.

For example, the identification information of the user in the insert subscriber request message may be internal identification information of the user. The HSS may find, from subscription information, the internal identification information of the user that corresponds to an external identifier of the user, include the internal identification information of the user in the insert subscriber request message, and send the insert subscriber request message to the MME/SGSN.

For example, the identification information of the monitoring event configuration in the insert subscriber data request message sent by the HSS to the MME/SGSN may be the SCEF reference ID.

Optionally, the message may further carry the event monitoring type information, where the event monitoring type information is used to indicate the MME/SGSN to cancel the event monitoring, of the specified type, of the user in the monitoring event configuration.

Step 708: The MME/SGSN cancels the event monitoring of the user in the monitoring event configuration.

The MME/SGSN receives the insert subscriber request message, and performs, based on the insert subscriber request message, an operation of canceling the event monitoring of the user in the monitoring event configuration.

As described above, the MME/SGSN monitors each user in the user group based on the monitoring event configuration. The monitoring event configuration includes but is not limited to: the identification information of the monitoring event configuration, the event monitoring type information, the identification information of the user, the maximum quantity of reporting times, and the like. In this application, the MME/SGSN may find, based on the identification information of the event configuration in the insert subscriber request message, the corresponding monitoring event configuration and the information about the monitoring event configuration, and find, based on the identification information of the user, the user whose monitoring needs to be canceled in the monitoring event configuration. The MME/SGSN cancels the event monitoring of the user in the monitoring event configuration, and deletes the information about the monitoring event configuration of the user. It means that information corresponding to the monitoring event configuration, of the user, that needs to be canceled is deleted.

In a possible implementation, if partial event monitoring of the user in the monitoring event configuration needs to be canceled, in other words, the insert subscriber request message includes the event monitoring type information, the MME/SGSN cancels the event monitoring, corresponding to the event monitoring type, of the user in the monitoring event configuration, continues to perform event monitoring of another event monitoring type on the user, and deletes, from the monitoring event configuration of the user, a monitoring event configuration corresponding to the event monitoring type for which cancellation needs to be performed.

When the maximum quantity of reporting times is at a granularity of each user, descriptions are provided below by using an example: A user 1 belongs to a user group 1, the user group 1 corresponds to a monitoring event configuration 1 and a monitoring event configuration 2, and the monitoring event configuration 1 includes an event monitoring type 1 and an event monitoring type 2. In this embodiment, cancellation needs to be performed for the event monitoring type 1 and the user in the monitoring event configuration 1. A context of the user 1 includes information corresponding to the monitoring event configuration 1 and information corresponding to the monitoring event configuration 2. For example, the MME/SGSN cancels event monitoring, of the event monitoring type 1, of the user 1 in the monitoring event configuration 1 based on an indication, and continues to maintain event monitoring, of the event monitoring type 2, of the user 1 in the monitoring event configuration 1 and event monitoring of the user 1 in the monitoring event configuration 2.

When the maximum quantity of reporting times is at a granularity of each user and each monitoring type, descriptions are provided by using an example: A user 1 belongs to a user group 1, the user group 1 corresponds to a monitoring event configuration 1 and a monitoring event configuration 2, and the monitoring event configuration 1 includes an event monitoring type 1 and an event monitoring type 2. In this embodiment, cancellation needs to be performed for the event monitoring type 1 and the user in the monitoring event configuration 1. A context of the user 1 includes information corresponding to the monitoring event configuration 1 and information corresponding to the monitoring event configuration 2. For example, the information about the monitoring event configuration 1 includes a quantity of remaining reporting times 3 of the event monitoring type 1 and a quantity of remaining reporting times 1 of the event monitoring type 2, and the information about the monitoring event configuration 2 includes a quantity of remaining reporting times 2. The MME/SGSN performs the following operations based on an indication: canceling event monitoring, of the event monitoring type 1, of the user 1 in the monitoring event configuration 1, and deleting the quantity of remaining reporting times of the event monitoring type 1 in the context of the user or setting the quantity of remaining reporting times to 0. In addition, the MME/SGSN continues to maintain event monitoring, of the event monitoring type 2, of the user 1 in the monitoring event configuration 1 and event monitoring of the user 1 in the monitoring event configuration 2.

Step 709: The MME/SGSN sends an insert subscriber data response message to the HSS.

After canceling the event monitoring of the user, the MME/SGSN sends the insert subscriber data response message to the HSS, to indicate that the MME/SGSN has performed the cancellation operation on the current user.

It should be noted that, if event monitoring of a plurality of users in the monitoring event configuration is canceled, the HSS performs step 707 to step 709 for each user that needs to be canceled. In other words, after receiving the insert subscriber data response message returned by the MME, the HSS performs step 707 to step 709 for another user, until step 707 to step 709 are performed for all users that need to be canceled.

In another embodiment, the HSS determines, based on the subscription information or an operator policy, to cancel the event monitoring of the user in the monitoring event configuration. A specific procedure is that step 701 to step 703 are not performed, and step 704 to step 709 are performed. A difference lies in the following steps.

Step 704: The HSS determines, based on the subscription information or the operator policy, to cancel the event monitoring of the user in the monitoring event configuration.

Step 705: The HSS sends a monitoring indication message to the SCEF.

Step 706: The SCEF sends a monitoring indication message to the SCS/AS.

In the foregoing embodiment, if the SCEF determines, after updating the information about the monitoring event configuration, that reporting for the user group is completed, the SCEF sends a subscription cancellation request message to the HSS, and the HSS further sends a subscription cancellation request message to the MME/SGSN.

Scenario 2

Figure 10:
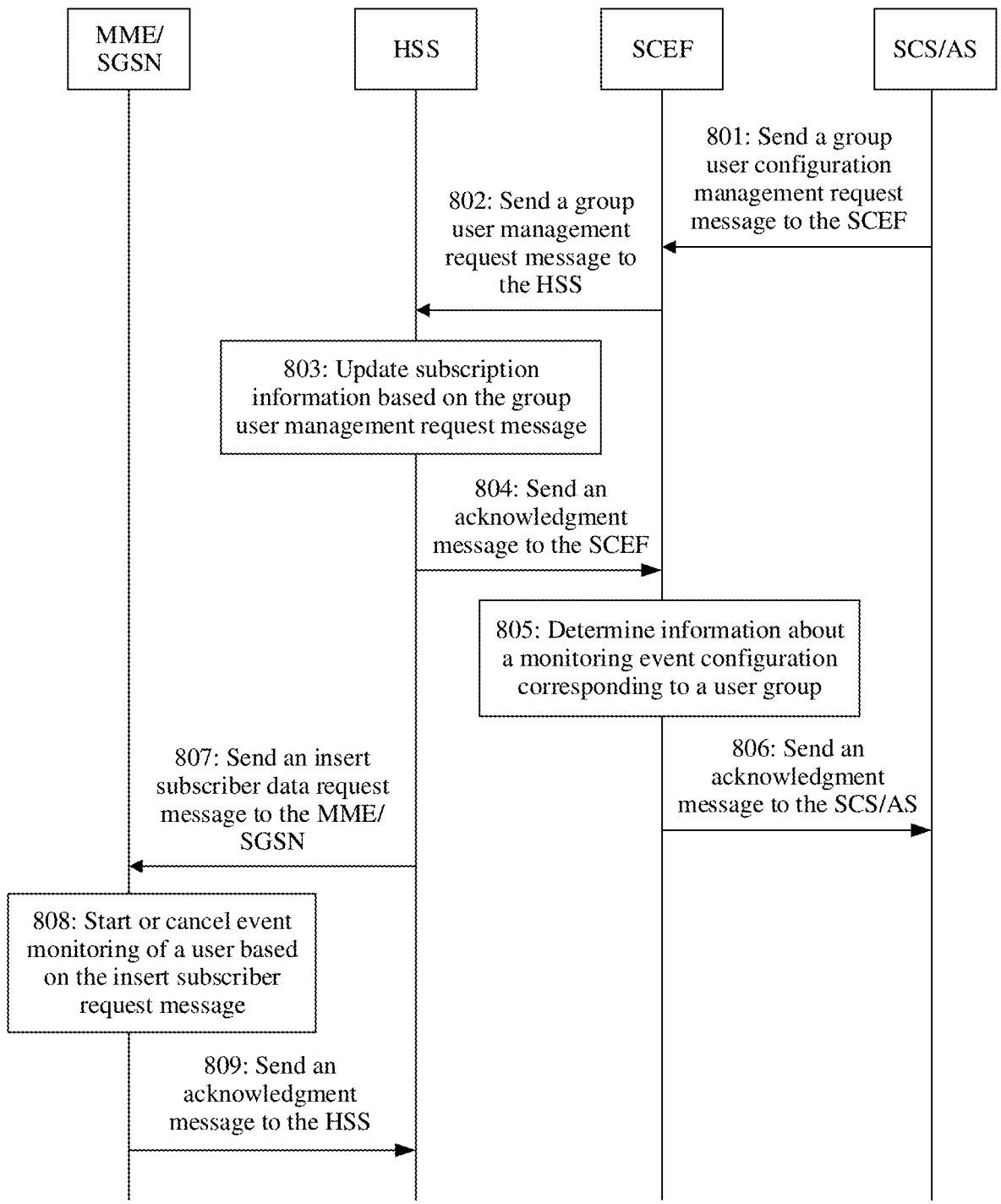
FIG. 10 is a schematic flowchart of an event monitoring management method according to an embodiment of this application.

With reference to FIG. 1, FIG. 10 is a schematic flowchart of an event monitoring management method according to an embodiment of this application. Details in FIG. 10 are described as follows:

For an event monitoring configuration procedure and an event monitoring monitoring procedure, refer to the embodiments shown in FIG. 3 and FIG. 4. Details are not described herein.

Step 801: An SCS/AS sends a group user configuration management request message to an SCEF.

The SCS/AS sends the group user configuration management request message to the SCEF, to indicate the SCEF to delete a user from a user group or add the user to the user group. This scenario is different from the scenario 1 in which event monitoring of a user in a monitoring event configuration is canceled. In the scenario 1, an operation is performed for event monitoring of a user in a specified monitoring event configuration. However, in this scenario, an operation is performed for all monitoring event configurations of a user in a user group to which the user belongs.

For example, the message includes but is not limited to: identification information of the user group, identification information of the user, and indication information. The indication information may be deletion indication information used to indicate to delete the user from the user group. The indication information may be addition indication information used to indicate to add the user to the user group.

For example, the identification information of the user group may be external identification information of the user group, and the identification information of the user may be external identification information of the user.

Optionally, there may be one or more pieces of user identification information in the message, and the one or more pieces of user identification information are used to indicate to delete one or more users from the user group, or add the one or more users to the user group.

Step 802: The SCEF sends a group user management request message to an HSS.

The SCEF sends the user management request message to the HSS, to indicate the HSS to update subscription information.

For example, the message includes but is not limited to: the identification information of the user group, the identification information of the user, and indication information. For example, the message includes the external identification information of the user group, the external identification information of the user, and the indication information.

Step 803: The HSS updates the subscription information based on the group user management request message.

As described above, the HSS stores the subscription information. In this embodiment, if the user needs to be added to or deleted from the user group, the HSS correspondingly updates the subscription information.

The HSS may search for the corresponding user group based on the external identification information of the user group, and search for internal identification information of the corresponding user group, to determine the user group and a user group list corresponding to the user group. The user group list includes internal identification information corresponding to one or more users.

In an example, if the indication information is deletion indication information, the HSS determines an internal identifier of the user based on an external identifier of the user, performs matching on the internal identifier of the user and the user group list, and deletes successfully matched internal identification information of the user from the user group list.

In another example, if the indication information is addition indication information, the HSS determines an internal identifier of the user based on an external identifier of the user, and adds internal identification information of the user to the user group list.

Step 804: The HSS sends an acknowledgment message to the SCEF.

After updating the subscription information, the HSS sends the acknowledgment message to the SCEF, to indicate that the HSS has updated the subscription information. The message includes but is not limited to the identification information of the user group.

Step 805: The SCEF determines information about a monitoring event configuration corresponding to the user group.

After receiving the acknowledgment message of the HSS, the SCEF determines that the HSS has updated the subscription information, and the SCEF may update information about the monitoring event configuration corresponding to the user group.

The SCEF may determine, based on the identification information that is of the user group and that is sent by the SCS/AS, the user group and the monitoring event configuration corresponding to the user group. The monitoring event configuration corresponding to the user group refers to all monitoring event configurations corresponding to the user group.

In an example, if the indication information is the deletion indication information, in other words, the user is deleted from the user group, the SCEF determines to remove a report of the user when collecting statistics on all event monitoring reports of the user group. For a removal manner, refer to step 702. Details are not described herein.

In another example, if the indication information is the addition indication information, in other words, the user is added to the user group, the SCEF determines to collect statistics on a user report of the user when collecting statistics on all event monitoring reports of the user group. The SCEF adds a quantity of added users to a quantity of group members recorded in information about each monitoring event configuration of the user group.

In a possible implementation, step 805 may alternatively be performed before step 802. This is not limited in this application.

Step 806: The SCEF sends an acknowledgment message to the SCS/AS.

The SCEF sends the acknowledgment message to the SCS/AS, to indicate that the SCEF completes related configuration. The message may carry the identification information of the user group.

Step 807: The HSS sends an insert subscriber data request message to an MME/SGSN.

The HSS sends the insert subscriber request message to the MME/SGSN, to indicate the MME/SGSN to delete the monitoring event configuration.

The insert subscriber request message includes but is not limited to: identification information of one or more monitoring event configurations corresponding to the user group, the identification information of the user, and indication information.

As described above, a user group corresponds to one or more monitoring event configurations. If a user is added to or deleted from a user group, information about all monitoring event configurations corresponding to the user group needs to be updated. The HSS has the identification information of the one or more monitoring event configurations corresponding to the user group in a configuration procedure, and may include the identification information in the insert subscriber request message and send the message to the MME/SGSN. For example, the identification information of the monitoring event configuration of the user group may be an SCEF reference ID. The HSS may find, based on the external identification information of the user group, the corresponding user group and the identification information of the one or more monitoring event configurations corresponding to the user group.

For example, the identification information of the user may be the internal identification information of the user.

In a possible implementation, if the indication information is used to indicate to add the user to the user group, the message further includes a related parameter of the monitoring event configuration, and is used to indicate the MME/SGSN to determine a monitoring event configuration of the user based on the related parameter of the monitoring event configuration. For example, the related parameter includes but is not limited to a maximum quantity of reporting times.

Step 808: The MME/SGSN starts or cancels event monitoring of the user based on the insert subscriber request message.

The MME/SGSN determines, based on the identification information of the one or more monitoring event configurations corresponding to the user group, one or more monitoring event configurations corresponding to the user in the user group.

In an example, if the indication information is deletion indication information, the MME/SGSN deletes the one or more monitoring event configurations corresponding to the user in the user group. For example, it is assumed that a user 1 belongs to a user group 1 and a user group 2, the user group 1 corresponds to a monitoring event configuration 1 whose monitoring event configuration identifier is an SCEF reference ID 1 and a monitoring event configuration 2 whose monitoring event configuration identifier is an SCEF reference ID 2, and the user group 2 corresponds to a monitoring event configuration 3 and a monitoring event configuration 4. If the user 1 needs to be deleted from the user group 1, the MME/SGSN deletes a corresponding monitoring event configuration based on identification information of the user 1 and the SCEF reference ID 1, and deletes a corresponding monitoring event configuration based on the identification information of the user 1 and the SCEF reference ID 2.

In another example, if the indication information is addition indication information, the MME/SGSN may configure and monitor event monitoring of the user based on the received related parameter of the monitoring event configuration. For example, the MME/SGSN receives a related parameter of a monitoring event configuration 1, for example, receives a maximum quantity of reporting times 3. The MME/SGSN writes the related parameter of the monitoring event configuration 1 into a context of a user 1, and performs event monitoring on the user based on information about the monitoring event configuration 1 in an updated context of the user. In other words, when performing event monitoring for the monitoring event configuration 1, the MME/SGSN performs event monitoring on the user 1 in addition to monitoring a preconfigured group member in a user group 1 corresponding to the monitoring event configuration 1.

Step 809: The MME/SGSN sends an acknowledgment message to the HSS.

The HSS repeatedly performs step 807 to step 809 for each user that needs to be added to or deleted from the user group, until step 807 to step 809 are performed for all users that need to be added to or deleted from the user group.

In another embodiment, the HSS determines, based on the subscription information or an operator policy, to delete the user from the user group or add the user to the user group. A specific procedure is that step 801 and step 802 are not performed, and step 803 to step 809 are performed. A difference lies in the following steps.

Step 803: The HSS determines, based on the subscription information or the operator policy, to delete the user from or add the user to the user group.

Step 804: The HSS sends a group user management request message to the SCEF.

Step 805: The SCEF sends a group user management request message to the SCS/AS.

In the foregoing embodiment, if the SCEF determines, after updating the information about the monitoring event configuration, that reporting for the user group is completed, the SCEF sends a subscription cancellation request message to the HSS, and the HSS further sends a subscription cancellation request message to the MME/SGSN.

Figure 11:
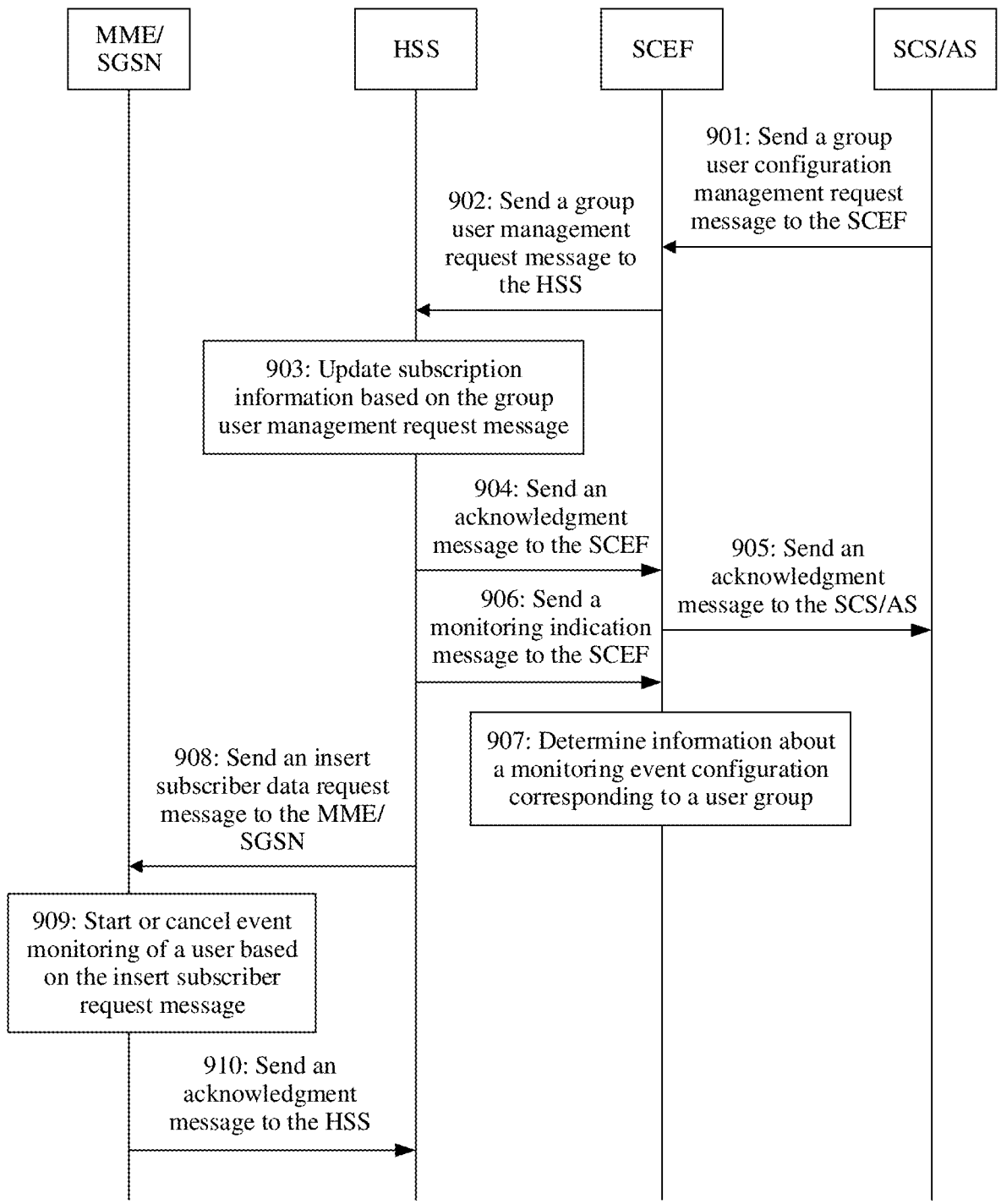
FIG. 11 is a schematic flowchart of an event monitoring management method according to an embodiment of this application.

With reference to FIG. 1, FIG. 11 is a schematic flowchart of an event monitoring management method according to an embodiment of this application. Details in FIG. 11 are described as follows:

For an event monitoring configuration procedure and an event monitoring monitoring procedure, refer to the embodiments shown in FIG. 3 and FIG. 4. Details are not described herein.

Step 901: An SCS/AS sends a group user configuration management request message to an SCEF.

For specific details, refer to step 801. Details are not described herein.

Step 902: The SCEF sends a group user management request message to an HSS.

For specific details, refer to step 802. Details are not described herein.

Step 903: The HSS updates subscription information based on the group user management request message.

For specific details, refer to step 803. Details are not described herein.

Step 904: The HSS sends an acknowledgment message to the SCEF.

For specific details, refer to step 804. Details are not described herein.

Step 905: The SCEF sends an acknowledgment message to the SCS/AS.

The SCEF sends the acknowledgment message to the SCS/AS, to indicate that the SCEF successfully receives the group user configuration management request message sent by the SCS/AS.

Step 906: The HSS sends a monitoring indication message to the SCEF.

The HSS sends the monitoring indication message to the SCEF, to indicate the SCEF to update information about a monitoring event configuration. It may also be understood as to indicate to delete a user from or add a user to a user group.

In a possible implementation, if the user needs to be deleted from the user group, the monitoring indication message sent by the HSS to the SCEF includes but is not limited to identification information of one or more monitoring event configurations corresponding to the user group and identification information of the user. For example, the identification information of the user may be external identification information of the user.

In another possible implementation, if the user needs to be added to the user group, the monitoring indication message sent by the HSS to the SCEF includes but is not limited to: identification information of one or more monitoring event configurations corresponding to the user group and a quantity of users that need to be added, or identification information of one or more monitoring event configurations corresponding to the user group and a quantity that is of group members in the user group and that needs to be updated, where the quantity that is of group members in the user group and that needs to be updated is a sum of a current quantity of group members in the user group and a quantity of users that need to be added.

Step 907: The SCEF determines information about the monitoring event configuration corresponding to the user group.

The SCEF may update, based on the monitoring indication message sent by the HSS, information about all monitoring event configurations corresponding to the user group.

For specific details, refer to step 805. Details are not described herein.

Step 908: The HSS sends an insert subscriber data request message to an MME/SGSN.

Step 909: The MME/SGSN starts or cancels event monitoring of the user based on the insert subscriber request message.

Step 910: The MME/SGSN sends an acknowledgment message to the HSS.

For step 908 to step 910, refer to step 807 to step 809. Details are not described herein.

In another embodiment, the HSS determines, based on the subscription information or an operator policy, to delete the user from the user group or add the user to the user group. A specific procedure is that step 901 to step 905 are not performed, and step 906 to step 910 are performed.

In the foregoing embodiment, if the SCEF determines, after updating the information about the monitoring event configuration, that reporting for the user group is completed, the SCEF sends a subscription cancellation request message to the HSS, and the HSS further sends a subscription cancellation request message to the MME/SGSN.

Scenario 3

Figure 12:
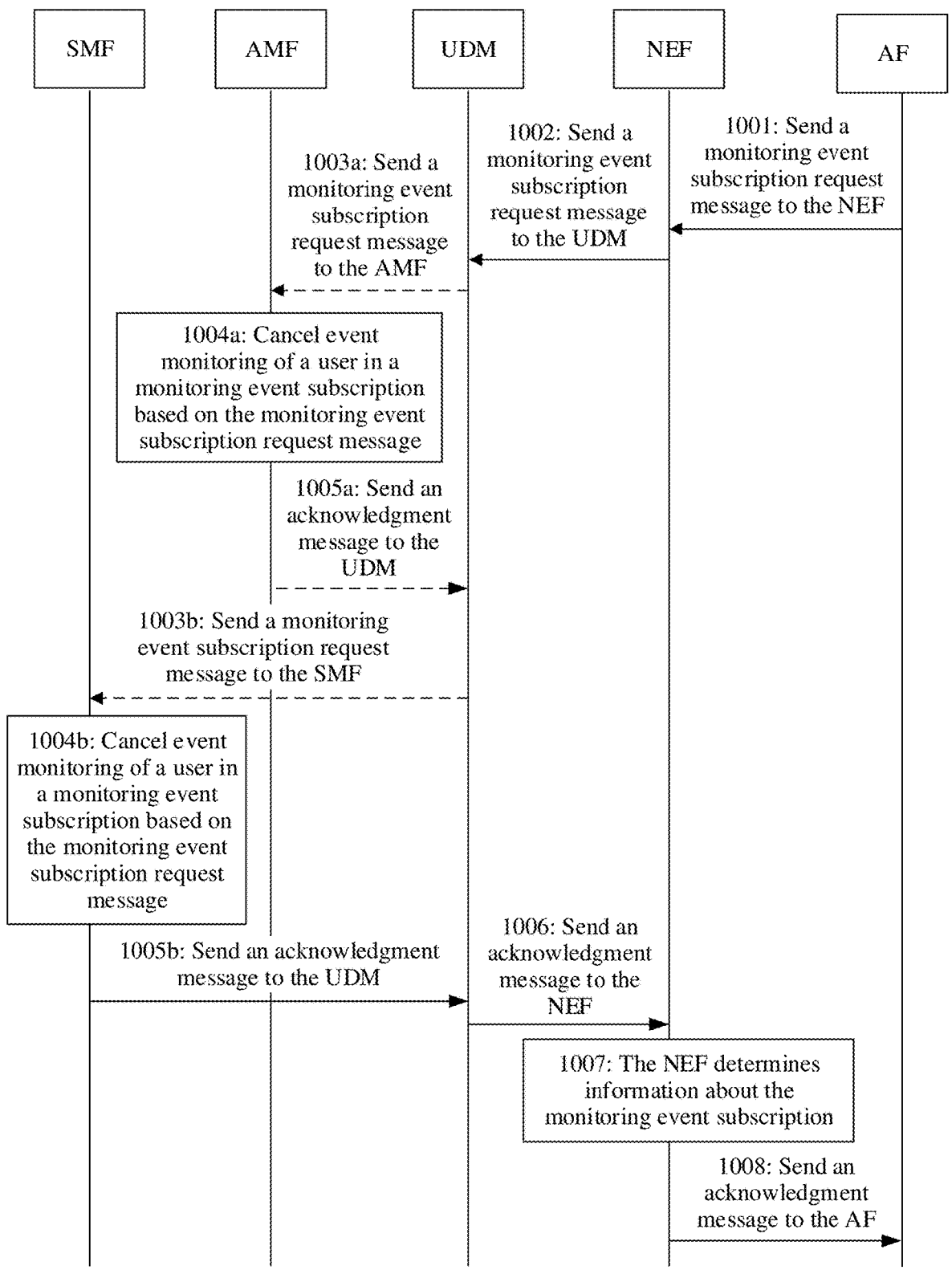
FIG. 12 is a schematic flowchart of an event monitoring management method according to an embodiment of this application.

With reference to FIG. 2, FIG. 12 is a schematic flowchart of a monitoring event subscription management method according to an embodiment of this application. Details in FIG. 12 are described as follows:

For a monitoring event subscription procedure and an event reporting procedure, refer to the embodiments shown in FIG. 5 and FIG. 6. Details are not described herein.

Step 1001: An AF sends a monitoring event subscription request message to a NEF.

The AF sends the monitoring event subscription request message to the NEF, to indicate to cancel event monitoring of a user in a monitoring event subscription.

For example, the message includes but is not limited to identification information of the monitoring event subscription, identification information of the user, and cancellation indication information.

The identification information of the monitoring event subscription is used to indicate the corresponding monitoring event subscription. For example, the identification information of the monitoring event subscription may be a NEF subscription correlation identifier.

The identification information of the user is used to identify the corresponding user. For example, the identification information of the user may be external identification information of the user, for example, a GPSI (Generic Public Subscription Identifier).

The cancellation indication information is used to indicate to cancel event monitoring of a specified user in the monitoring event subscription corresponding to the NEF subscription correlation identifier, and the specified user is the user corresponding to the identification information of the user.

In a possible implementation, the monitoring request message may further include one or more event identifiers. As described above, in a monitoring event subscription process, a single monitoring event subscription may correspond to one or more event monitoring types. In this application, the AF may indicate to cancel event monitoring, corresponding to the one or more event identifiers, of the specified user in the monitoring event subscription.

For other details, refer to step 701. Details are not described herein.

Step 1002: The NEF sends a monitoring event subscription request message to a UDM.

The NEF sends a monitoring event subscription request message to the UDM, where the monitoring event subscription request message includes identification information of the monitoring event subscription, the identification information of the user, and cancellation indication information.

For example, the identification information of the monitoring event subscription in the monitoring request message may be a UDM subscription correlation identifier, and the identification information of the user may be the external identification information of the user.

Optionally, the monitoring request message may further carry the one or more event identifiers, where the event identifier is used to indicate to cancel the event monitoring, corresponding to the specified event identifier, of the user in the monitoring event subscription.

Optionally, the monitoring event subscription request message may further carry validity indication information, where the validity indication information is used to indicate that the cancellation operation is always valid. In other words, after the monitoring event subscription is deleted, the cancellation operation is still valid. For example, the validity indication information may include at least one of the following: the identification information of the user, the event identifier, identification information of the AF, and a monitoring cancellation indication. The UDM stores the validity indication information in a UDR. When the AF subsequently performs event subscription for a user group again, the UDM removes, when sending member user information of the user group to the NEF, the user based on the validity indication information obtained from the UDR, and indicates an AMF or an SMF not to perform event monitoring on the user.

After receiving the monitoring indication message, the UDM stores the parameters carried in the monitoring indication message. In addition, the UDM may search, based on the identification information of the user, for the AMF or the SMF corresponding to the user.

Step 1003*a*: The UDM sends a monitoring event subscription request message to the AMF.

After finding the AMF corresponding to the user, the UDM sends the monitoring event subscription request message to the AMF. The message includes but is not limited to identification information of the user, identification information of the monitoring event subscription, and cancellation indication information.

For example, the identification information of the user in the monitoring event subscription request message may be internal identification information of the user. The UDM may find, from subscription information, the internal identification information of the user that corresponds to an external identifier of the user, include the internal identification information of the user in the monitoring event subscription request message, and send the monitoring event subscription request message to the AMF.

For example, the identification information of the monitoring event subscription in the monitoring event subscription request message sent by the UDM to the AMF may be an AMF subscription correlation identifier.

Optionally, the message may further carry event identification information, where the event identification information is used to indicate the AMF to cancel the event monitoring, corresponding to the specified event identifier, of the user in the monitoring event subscription.

Step 1004*a*: The AMF cancels the event monitoring of the user in the monitoring event subscription based on the monitoring event subscription request message.

The AMF receives the monitoring event subscription request message, and performs, based on the monitoring event subscription request message, an operation of canceling the event monitoring of the user in the monitoring event subscription.

In a possible implementation, if a maximum quantity of reporting times is at a granularity of each user, for example, the monitoring event subscription request message carries the identification information of the user, the identification information of the monitoring event subscription, and the cancellation indication information, and is used to indicate to cancel the event monitoring of the user in the monitoring event subscription. The AMF cancels the event monitoring of the user in the monitoring event subscription based on the monitoring event subscription request message, and deletes information corresponding to a monitoring event subscription of the user. For example, a context of the user includes information about one or more monitoring event subscriptions, and the AMF may delete, from the context of the user, information corresponding to the monitoring event subscription that needs to be cancelled, for example, a quantity of remaining reporting times. In addition, the AMF adds a cancel mark in the context of the user, to indicate to cancel the event monitoring of the user in the monitoring event subscription (for example, the cancel mark may be a UDM notification endpoint or a NEF notification endpoint and a corresponding cancellation indication, and this is not limited in this application), or sets the quantity of remaining reporting times to 0 in the information about the corresponding monitoring event subscription in the context of the user. In other words, after the user moves to another AMF, the another AMF may skip, based on the context of the user, performing event monitoring on the user whose monitoring event subscription needs to be canceled.

In a possible implementation, if a maximum quantity of reporting times is at a granularity of each user, for example, the monitoring event subscription request message carries the identification information of the user, the identification information of the monitoring event subscription, the event identifier, and the cancellation indication information. For example, the AMF adds a cancel mark in a context of the user, to indicate to cancel the event monitoring, corresponding to the specified event identifier, of the user in the event monitoring configuration. In other words, after the user moves to another AMF, the another AMF may determine, based on the context of the user, that the event monitoring, corresponding to the specified event identifier, of the user in the event subscription needs to be canceled.

In a possible implementation, if a maximum quantity of reporting times is at a granularity of each user and each event identifier, for example, the monitoring event subscription request message carries the identification information of the user, the identification information of the monitoring event subscription, the event identifier, and the cancellation indication information. The AMF cancels, based on the monitoring event subscription request message, the event monitoring, corresponding to the specific event identifier, of the user in the monitoring event subscription. For example, a context of the user includes information about one or more monitoring event subscriptions, and the AMF may delete, from the context of the user, information corresponding to the specific event identifier in the monitoring event subscription that needs to be canceled, for example, a quantity of remaining reporting times. In addition, the AMF adds a cancel mark to the context of the user, to indicate to cancel the event monitoring, corresponding to the specific event identifier, of the user in the monitoring event subscription (for example, the cancel mark may be a UDM notification endpoint or a NEF notification endpoint, the corresponding event identifier, or a cancellation indication, and this is not limited in this application), or sets the quantity of remaining reporting times corresponding to the specific event identifier to 0 in the information about the corresponding monitoring event subscription in the context of the user. In other words, after the user moves to another AMF, the another AMF may skip, based on the context of the user, performing event monitoring corresponding to the specific event identifier on the user whose monitoring event subscription needs to be canceled.

Step 1005a: The AMF sends an acknowledgment message to the UDM.

The AMF sends the acknowledgment message to the UDM, to indicate that the AMF has completed related configuration.

Step 1003b: The UDM sends an monitoring event subscription request message to the SMF.

Refer to step 1003a. Details are not described herein.

Step 1004b: The SMF cancels the event monitoring of the user in the monitoring event subscription based on the monitoring event subscription request message.

Refer to step 1004a. Details are not described herein.

Step 1005b: The SMF sends an acknowledgment message to the UDM.

It should be noted that, if event monitoring of a plurality of users in the monitoring event subscription is canceled, the UDM performs step 1003a to step 1005a or step 1003b to step 1005b for each user that needs to be canceled. In other words, after receiving the monitoring event subscription response message returned by the AMF/SMF, the UDM performs step 1003a to step 1005a or step 1003b to step 1005b for another user, until step 1003a to step 1005a or step 1003b to step 1005b are performed for all users that need to be canceled.

Step 1006: The UDM sends an acknowledgment message to the NEF.

The UDM sends the acknowledgment message to the NEF, to indicate that related configuration has been completed.

Step 1007: The NEF determines information about the monitoring event subscription.

Specific details are similar to those in step 702, and details are not described herein.

It should be noted that step 1007 may alternatively be performed before step 1002. In other words, it is considered by default that the UDM can successfully perform related configuration.

Step 1008: The NEF sends an acknowledgment message to the AF.

The NEF sends the acknowledgment message to the AF, to indicate that the NEF has completed related configuration. The message may carry the identification information of the event monitoring configuration.

In another embodiment, the UDM determines, based on the subscription information or an operator policy, to cancel the event monitoring of the user in the event subscription. A specific procedure is that step 1001 and step 1002 are not performed, and step 1003a to step 1008 are performed. A difference lies in the following steps.

Step 1006: The UDM sends an event subscription notification message to the NEF.

Step 1007: The NEF sends an event subscription notification to the AF.

In the foregoing embodiment, if the NEF determines, after updating the information about the monitoring event configuration, that reporting for the user group is completed, the NEF sends a subscription cancellation request message to the UDM, and the UDM further sends a subscription cancellation request message to the AMF.

Scenario 4

Figure 13:
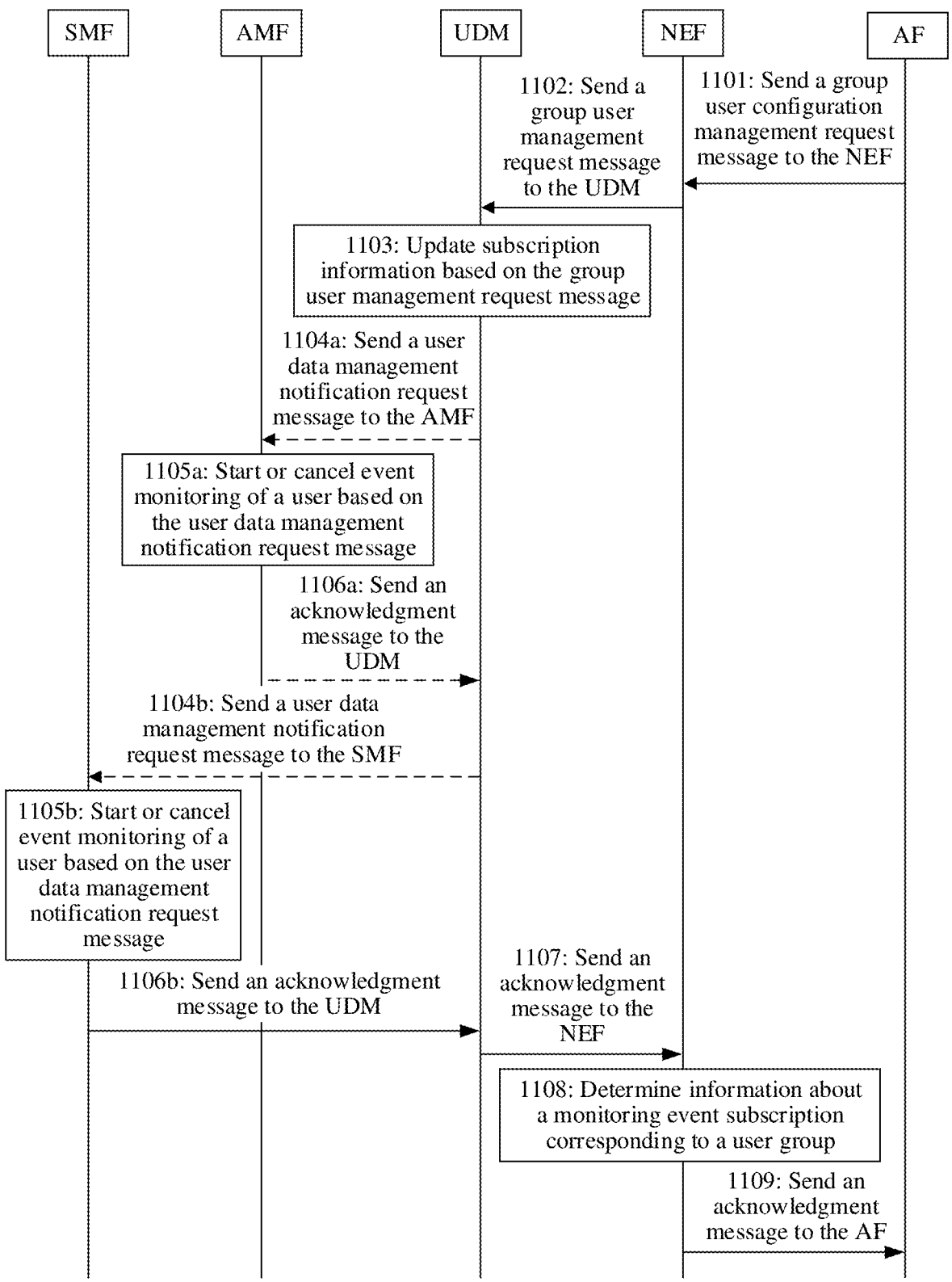
FIG. 13 is a schematic flowchart of an event monitoring management method according to an embodiment of this application.

With reference to FIG. 2, FIG. 13 is a schematic flowchart of an event subscription management method according to an embodiment of this application. Details in FIG. 13 are described as follows:

For a monitoring event subscription procedure and an event reporting procedure, refer to the embodiments shown in FIG. 5 and FIG. 6. Details are not described herein.

Step 1101: An AF sends a group user configuration management request message to a NEF.

The AF sends the group user configuration management request message to the NEF, to indicate to delete a user from a user group or add the user to the user group.

For example, the message includes but is not limited to: identification information of the user group, identification information of the user, and indication information. The indication information may be deletion indication information used to indicate to delete the user from the user group. The indication information may be addition indication information used to indicate to add the user to the user group.

For example, the identification information of the user group may be external identification information of the user group, and the identification information of the user may be external identification information of the user.

Optionally, there may be one or more pieces of user identification information in the message, and the one or more pieces of user identification information are used to indicate to delete one or more users from the user group, or add the one or more users to the user group.

Step 1102: The NEF sends a group user management request message to a UDM.

The NEF sends the user management request message to the UDM, to indicate the UDM to update subscription information.

For example, the message includes but is not limited to: the identification information of the user group, the identification information of the user, and indication information. For example, the message includes the external identification information of the user group, the external identification information of the user, and the indication information.

Step 1103: The UDM updates the subscription information based on the group user management request message.

For specific details, refer to step 803. Details are not described herein.

Step 1104*a*: The UDM sends a user data management notification request message to an AMF.

The UDM sends the user data management notification request message to the AMF corresponding to the user, to indicate the AMF to delete the user from or add the user to the user group.

For example, the user data management notification request message includes but is not limited to: an internal group identifier list of the user, where the list is used to indicate one or more user groups to which the user belongs. In an example, if the indication information indicates to delete the user from the user group, identification information of the one or more user groups in the internal group identifier list of the user does not include the identification information of the user group.

In another example, if the indication information indicates to add the user to the user group, identification information of the one or more user groups in the internal group identifier list of the user includes the identification information of the specified user group.

It should be noted that, as described above, in a configuration procedure in a 5G network, information that is about a monitoring event subscription of a user group and that is stored by an AMF/SMF is group subscription information, to be specific, includes configuration parameters of all event monitoring configurations corresponding to the user group. It may also be understood that the AMF may determine, based on the group subscription information, a parameter that is of an event monitoring configuration and that is required by each group member in the user group. Therefore, the user data management notification request message sent by the UDM does not need to carry identification information of one or more event monitoring configurations corresponding to the user group.

Step 1105*a*: The AMF starts or cancels event monitoring of the user based on the user data management notification request message.

In an example, if the UDM indicates to delete the user from the user group, the AMF determines, based on the internal group identifier list of the user, that the user no longer belongs to the specified user group. The AMF may determine, based on the identification information of the user group, one or more monitoring event subscriptions (which may also be understood as group subscription information) corresponding to the user group. In this case, the AMF stops event monitoring of the user that needs to be deleted in the one or more monitoring event subscriptions corresponding to the user group, and deletes information about one or more monitoring event subscriptions, of the user, corresponding to the user group. For specific details, refer to step 1004*a*. Details are not described herein.

In another example, if the UDM indicates to add the user to the user group, the AMF determines, based on the internal group identifier list of the user, that the user belongs to the specified user group. The AMF may determine, based on the identification information of the user group, one or more monitoring event subscriptions (which may also be understood as group subscription information) corresponding to the user group. In this case, the AMF starts event monitoring, of the user that needs to be added, in the one or more monitoring event subscriptions corresponding to the user group.

In a possible implementation, if the UDM indicates to add the user to the user group, but the AMF does not store information about the monitoring event subscription of the user group, in other words, the AMF does not store the group subscription information of the user group, the monitoring event subscription request message sent by the UDM to the AMF further includes the information about the event subscription of the user group, so that the AMF may perform event monitoring on the added user based on the information about the event monitoring configuration of the user group.

Step 1106*a*: The AMF sends an acknowledgment message to the UDM.

Step 1104*b*: The UDM sends a user data management notification request message to an SMF.

Step 1105*b*: The SMF starts or cancels event monitoring of the user based on the user data management notification request message.

Step 1106*b*: The SMF sends an acknowledgment message to the UDM.

For step 1104*b* to step 1106*b*, refer to step 1104*a* to step 1106*a*. Details are not described herein.

It should be noted that the UDM repeatedly performs step 1104*a* to step 1106*a* or step 1104*b* to step 1106*b* for each user that needs to be added or deleted, until step 1104*a* to step 1106*a* or step 1104*b* to step 1106*b* are performed for all users that need to be added to or deleted from the user group.

Step 1107: The UDM sends an acknowledgment message to the NEF.

Step 1108: The NEF determines information about the monitoring event subscription corresponding to the user group.

For specific details, refer to step 805. Details are not described herein.

It should be noted that step 1108 may be performed before step 1102. This is not limited in this application.

Step 1109: The NEF sends an acknowledgment message to the AF.

In another embodiment, the UDM determines, based on the subscription information or an operator policy, to delete the user from the user group or add the user to the user group. A specific procedure is that step 1101 to step 1103 are not performed, and step 1104*a* to step 1109 are performed. A difference lies in the following steps.

Step 1107: The UDM sends a group user management request message to the NEF.

Step 1109: The NEF sends a group user management request message to the AF.

In the foregoing embodiment, if the NEF determines, after updating the information about the monitoring event configuration, that reporting for the user group is completed, the NEF sends a subscription cancellation request message to the UDM, and the UDM further sends a subscription cancellation request message to the AMF.

Figure 14A:
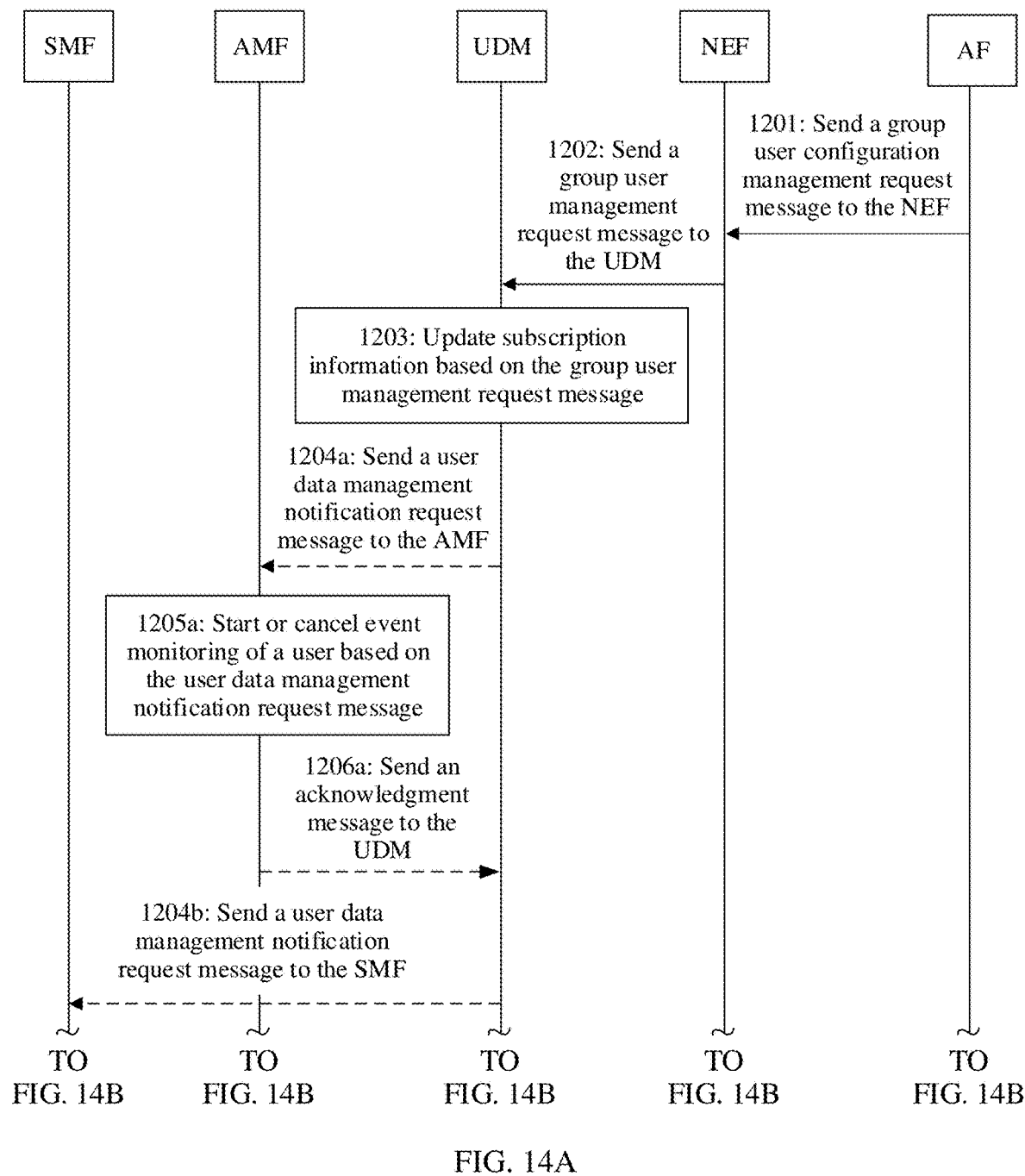
FIG. 14A and FIG. 14B are a schematic flowchart of an event monitoring management method according to an embodiment of this application.
Figure 14B:
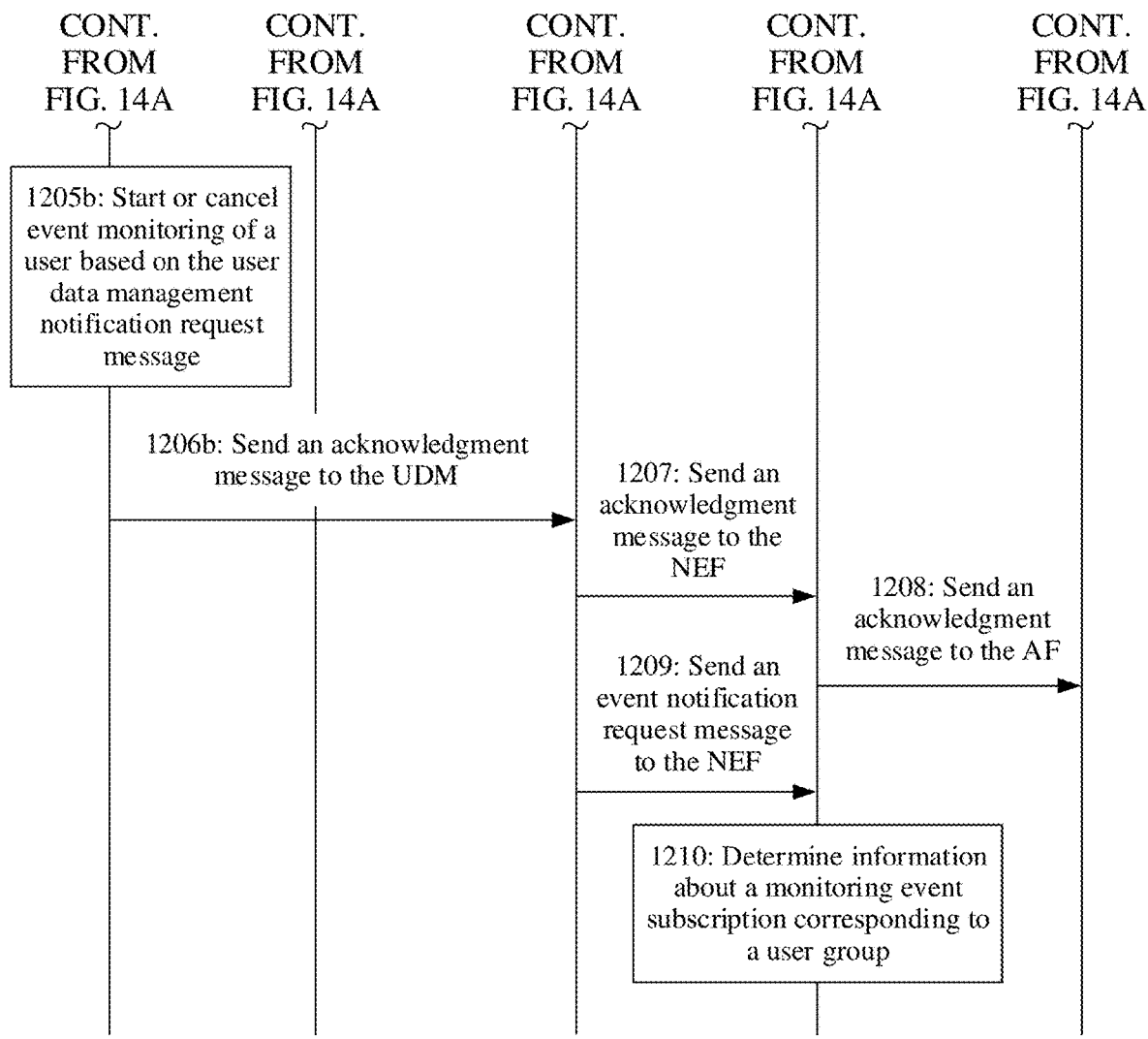

With reference to FIG. 2, FIG. 14A and FIG. 14B are a schematic flowchart of an event monitoring management method according to an embodiment of this application. Details in FIG. 14A and FIG. 14B are described as follows:

For an event monitoring configuration procedure and an event monitoring monitoring procedure, refer to the embodiments shown in FIG. 5 and FIG. 6. Details are not described herein.

Step 1201: An AF sends a group user configuration management request message to a NEF.

Step 1202: The NEF sends a group user management request message to a UDM.

Step 1203: The UDM updates subscription information based on the group user management request message.

Step 1204a: The UDM sends a user data management notification request message to an AMF.

Step 1205a: The AMF starts or cancels event monitoring of a user based on the user data management notification request message.

Step 1206a: The AMF sends an acknowledgment message to the UDM.

Step 1204b: The UDM sends a user data management notification request message to an SMF.

Step 1205b: The SMF starts or cancels event monitoring of a user based on the user data management notification request message.

Step 1206b: The SMF sends an acknowledgment message to the UDM.

For step 1201 to step 1206, refer to step 1101 to step 1106. Details are not described herein.

Step 1207: The UDM sends a user group management acknowledgment message to the NEF.

Step 1208: The NEF sends a user group management acknowledgment message to the AF.

Step 1209: The UDM sends an event notification message to the NEF.

The UDM sends the event notification message to the NEF, to indicate the NEF to update information about an event subscription. It may also be understood as to indicate to delete the user from or add the user to a user group.

In a possible implementation, if the user needs to be deleted from the user group, the event notification message sent by the UDM to the NEF includes but is not limited to: identification information of one or more monitoring event subscriptions corresponding to the user group and identification information of the user. For example, the identification information of the event subscription may be a NEF notification endpoint, and the identification information of the user may be external identification information of the user.

In another possible implementation, if the user needs to be added to the user group, the event notification message sent by the UDM to the NEF includes but is not limited to: identification information of one or more event subscription corresponding to the user group, and a quantity of users that need to be added or a list of identifiers of users that need to be added; or identification information of one or more monitoring event subscriptions corresponding to the user group, and a quantity that is of group members in the user group and that needs to be updated or a list of identifiers of new member users in the user group. The quantity that is of group members in the user group and that needs to be updated is a sum of a current quantity of group members in the user group and the quantity of users that need to be added.

Step 1210: The NEF determines information about the monitoring event subscription corresponding to the user group.

The NEF may update, based on the event notification message sent by the UDM, information about all event subscriptions corresponding to the user group.

For specific details, refer to step 805. Details are not described herein.

In another embodiment, the UDM determines, based on the subscription information or an operator policy, to delete the user from the user group or add the user to the user group. A specific procedure is that step 1201 to step 1203 are not performed, and step 1204a to step 1209 are performed.

In the foregoing embodiment, if the NEF determines, after updating the information about the monitoring event configuration, that reporting for the user group is completed, the NEF sends a subscription cancellation request message to the UDM, and the UDM further sends a subscription cancellation request message to the AMF.

The foregoing mainly describes the solutions provided in embodiments of this application from a perspective of interaction between network elements. It can be understood that to implement the foregoing functions, each network element includes a corresponding hardware structure and/or software module for performing each function. A person skilled in the art should be easily aware that, in combination with units and algorithm steps of the examples described in the embodiments disclosed in this specification, embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, each network element may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. During actual implementation, another division manner may be used.

Figure 15:
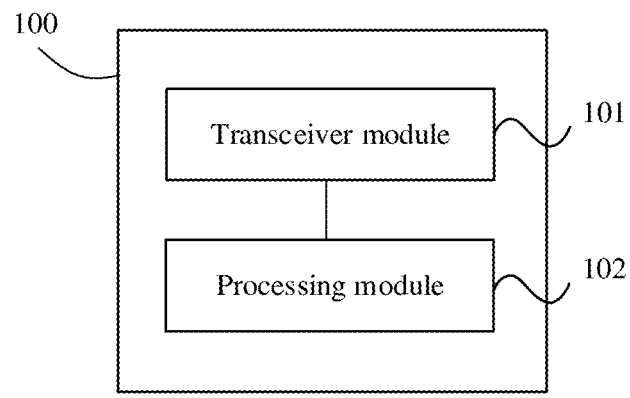
FIG. 15 is a schematic diagram of a structure of a network element according to an embodiment of this application.

When each functional module is obtained through division based on each corresponding function, FIG. 15 is a schematic diagram of a possible structure of a network element 100 in the foregoing embodiments. As shown in FIG. 15, the network element 100 may include a transceiver module 101 and a processing module 102.

In an example, the transceiver module 101 is configured to receive an indication message, where the indication message includes identification information of a monitoring event configuration, identification information of a user, and indication information, the identification information of the monitoring event configuration is used to indicate a first monitoring event configuration of a user group to which the user belongs, and the indication information is used to indicate to cancel event monitoring of the user in the first monitoring event configuration. The processing module 102 is configured to determine information about the first monitoring event configuration based on the indication message, where the information about the first monitoring event configuration includes at least one of the following: group member information of the user group and information about a quantity of monitoring event reporting times of the user. The transceiver module 101 is configured to send a delete message to a second network element, to indicate the second network element to delete the first monitoring event configuration, where the delete message is sent to the second network element after it is determined, based on the information about the first monitoring event configuration, that reporting of first event monitoring is completed.

In a possible implementation, the information about the first monitoring event configuration indicates to remove a monitoring event report corresponding to the user when statistics about a report of the first monitoring event configuration of the user group are collected.

In a possible implementation, the group member information of the user group includes: a quantity of group members in the user group is a difference between a currently stored quantity of group members in the user group and a quantity of the user; or a member user of the user group is obtained after the user is deleted from currently stored member users of the user group.

In a possible implementation, the processing module 102 is configured to delete the stored quantity of monitoring event reporting times of the user.

In a possible implementation, the processing module 102 is configured to set the quantity of monitoring event reporting times of the user to a maximum quantity of reporting times. In other words, it is considered by default that reporting of the user is completed.

In another example, the transceiver module 101 is configured to receive an indication message, where the indication message includes identification information of a user group, identification information of a user, and indication information, the identification information of the user group is used to indicate the user group to which the user belongs, and the indication information is used to indicate to delete the user from the user group or add the user to the user group. The processing module 102 is configured to determine, based on the indication message, information about a monitoring event configuration corresponding to the user group, where the information about the monitoring event configuration includes at least one of the following: group member information of the user group and information about a quantity of monitoring event reporting times of the user. The transceiver module 101 is configured to send a delete message to a second network element, to indicate the second network element to delete the monitoring event configuration, where the delete message is sent to the second network element after it is determined, based on the information about the monitoring event configuration, that reporting of event monitoring is completed.

In a possible implementation, the indication information is used to indicate to delete the user from the user group, and the information about the monitoring event configuration indicates to remove a monitoring event report corresponding to the user when statistics about a report of the monitoring event configuration of the user group are collected.

In a possible implementation, the indication information is used to indicate to delete the user from the user group, and a quantity of group members in the user group is a difference between a currently stored quantity of group members in the user group and a quantity of the user.

In a possible implementation, the processing module 102 is configured to delete the stored quantity of monitoring event reporting times of the user.

In a possible implementation, the processing module 102 is configured to identify the quantity of monitoring event reporting times of the user to a maximum quantity of reporting times.

In a possible implementation, the indication information is used to add the user to the user group, and the information about the monitoring event configuration indicates to collect statistics on the quantity of monitoring event reporting times corresponding to the user.

In a possible implementation, the indication information is used to add the user to the user group, and a quantity of group members in the user group is a sum of a currently stored quantity of group members in the user group and a quantity of the user.

In another example, the transceiver module 101 is configured to receive an indication message, where the indication message includes identification information of a monitoring event configuration, identification information of a user, and indication information, the identification information of the monitoring event configuration is used to indicate a first monitoring event configuration of a user group to which the user belongs, and the indication information is used to indicate to cancel event monitoring of the user in the first monitoring event configuration. The processing module 102 is configured to cancel the event monitoring of the user in the first monitoring event configuration based on the indication message.

In a possible implementation, the indication message further includes an event monitoring type, and the processing module 102 is configured to cancel event monitoring, of the event monitoring type, of the user in the first monitoring event configuration.

In a possible implementation, the processing module 102 is configured to determine a context of the user based on the indication message, where the context of the user indicates to cancel the event monitoring of the user in the first monitoring event configuration.

In a possible implementation, the indication message further includes the event monitoring type, and the transceiver module 101 is configured to send the context of the user to a fourth network element, to indicate the fourth network element to cancel the event monitoring of the user in the first monitoring event configuration.

In another example, the transceiver module 101 is configured to receive an indication message, where the indication message includes identification information of a user group, identification information of a user, and indication information, the identification information of the user group is used to indicate the user group, and the indication information is used to indicate to delete the user from the user group or add the user to the user group. The processing module 102 is configured to: if the indication information is used to indicate to delete the user from the user group, cancel event monitoring of the user in a monitoring event configuration corresponding to the user group; or if the indication information is used to indicate to add the user to the user group, start to perform event monitoring on the user in a monitoring event configuration corresponding to the user group.

In a possible implementation, the indication information is used to indicate to delete the user from the user group, and the processing module 102 is further configured to update a context of the user, where an updated context of the user indicates that the user does not belong to the user group.

In a possible implementation, the indication information is used to indicate to add the user to the user group, and the processing module 102 is further configured to update a context of the user, where an updated context of the user indicates that the user belongs to the user group.

Figure 16:
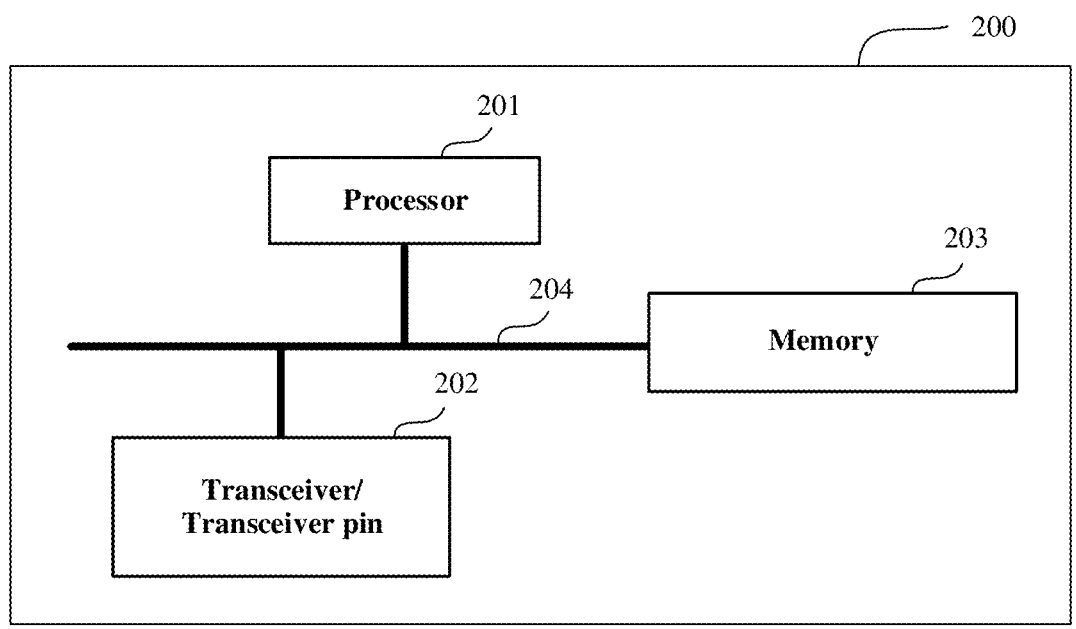
FIG. 16 is a schematic diagram of a structure of an apparatus according to an embodiment of this application.

In another example, FIG. 16 is a schematic block diagram of an apparatus 200 according to an embodiment of this application. The apparatus 200 may include a processor 201 and a transceiver/transceiver pin 202, and optionally, further include a memory 203. The processor 201 may be configured to perform steps performed by any network element in the methods in the foregoing embodiments, and control a receiver pin to receive a signal and control a transmitter pin to send a signal.

Components of the apparatus 200 are coupled together by using a bus system 204. In addition to a data bus, the bus system 204 further includes a power bus, a control bus, and a status signal bus. However, for clarity of description, various buses are marked as the bus system 204 in the figure.

Optionally, the memory 203 may be configured to store instructions in the foregoing method embodiments.

It should be understood that the apparatus 200 according to this embodiment of this application may correspond to any network element in the methods in the foregoing embodiments, and the foregoing and other management operations and/or functions of the components in the apparatus 200 are intended to implement corresponding steps in the foregoing methods. For brevity, details are not described herein again.

All related content of the steps in the method embodiments may be cited in function descriptions of corresponding functional modules. Details are not described herein again.

Based on a same technical concept, an embodiment of this application further provides a computer-readable storage medium. The computer-readable storage medium stores a computer program, the computer program includes at least one segment of code, and the at least one segment of code may be executed by an apparatus, to control the apparatus to implement the foregoing method embodiments.

Based on a same technical concept, an embodiment of this application further provides a computer program. When the computer program is executed by an apparatus, the foregoing method embodiments are implemented.

The program may be completely or partially stored in a storage medium that is encapsulated with a processor, or may be completely or partially stored in a memory that is not encapsulated with a processor.

Based on a same technical concept, an embodiment of this application further provides a processor. The processor is configured to implement the foregoing method embodiments. The processor may be a chip.

Based on a same technical concept, an embodiment of this application further provides a system. The system includes the network elements in the foregoing method embodiments.

Methods or algorithm steps described in combination with the content disclosed in embodiments of this application may be implemented by hardware, or may be implemented by a processor by executing software instructions. The software instructions may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, the storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network device. Certainly, the processor and the storage medium may alternatively exist in the network device as discrete components.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose computer or a dedicated computer.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the purposes of this application and the protection scope of the claims, and all the modifications shall fall within the protection scope of this application.

What is claimed is:

1. An event subscription management method, comprising: receiving an indication message, wherein the indication message comprises identification information of a subscription event configuration, identification information of a user of a user group, and indication information, wherein the identification information of the subscription event configuration indicates a first subscription event configuration of the user group to which the user belongs, and the indication information indicates to cancel an event subscription of the user in the first subscription event configuration;
   in response to the indication information indicating to cancel the event subscription of the user of the user group in the first subscription event configuration, setting a quantity of subscription event reporting times of the user to a predetermined maximum quantity of reporting times;
   sending a delete message to a second network element, to indicate to the second network element to delete the first subscription event configuration, wherein the delete message is sent to the second network element after being determined, based on the predetermined maximum quantity of reporting times, that reporting of a first event subscription is completed.

2. The method according to claim 1, wherein the predetermined maximum quantity of reporting time indicates that a subscription event report corresponding to the user is to be removed in response to statistics of a report of the first subscription event configuration of the user group are being collected.

3. The method according to claim 1, wherein the predetermined maximum quantity of reporting times indicates that subscription event reporting corresponding to the user is completed.

4. An apparatus, comprising: a non-transitory memory and a processor, wherein the non-transitory memory is coupled to the processor; and the non-transitory memory is configured to store non-transitory instructions; and in response to non-transitory instructions being executed by the processor, cause the apparatus to perform operations comprising:

receiving an indication message, wherein the indication message comprises identification information of a subscription event configuration, identification information of a user of a user group, and indication information, wherein the identification information of the subscription event configuration indicates a first subscription event configuration of the user group to which the user belongs, and the indication information indicates to cancel an event subscription of the user in the first subscription event configuration;

in response to the indication information indicating to cancel the event subscription of the user of the user group in the first subscription event configuration, setting a quantity of subscription event reporting times of the user to a predetermined maximum quantity of reporting times; and sending a delete message to a second network element, to indicate to the second network element to delete the first subscription event configuration, wherein the delete message is sent to the second network element after being determined, based on the predetermined maximum quantity of reporting times, that reporting of a first event subscription is completed.

5. The apparatus according to claim 4, wherein the predetermined maximum quantity of reporting time indicates that a subscription event report corresponding to the user is to be removed in response to statistics of a report of the first subscription event configuration of the user group are being collected.

6. The apparatus according to claim 4, wherein the predetermined maximum quantity of reporting time indicates that subscription event reporting corresponding to the user is completed.

7. The method according to claim 1, wherein the method is performed by a service capability exposure function network element.

8. The method according to claim 7, wherein the second network element is a home subscriber server.

9. The method according to claim 1, wherein the method is performed by a network exposure function network element.

10. The method according to claim 9, wherein the second network element is a unified data management network element.

11. The apparatus according to claim 4, wherein the apparatus is a service capability exposure function network element.

12. The apparatus according to claim 4, wherein the apparatus is a network exposure function network element.

13. The method according to claim 1, further comprising: receiving, by the second network element, the delete message.

14. A system, comprising: an exposure function network element and a second network element, wherein the exposure function network element configured to:

receive an indication message, wherein the indication message comprises identification information of a subscription event configuration, identification information of a user of a user group, and indication information, wherein the identification information of the subscription event configuration indicates a first subscription event configuration of the user group to which the user belongs, and the indication information indicates to cancel an event subscription of the user in the first subscription event configuration;

in response to the indication information indicating to cancel the event subscription of the user of the user group in the first subscription event configuration, set a quantity of subscription event reporting times of the user to a predetermined maximum quantity of reporting times; and send a delete message to a second network element, to indicate to the second network element to delete the first subscription event configuration, wherein the delete message is sent to the second network element after being determined, based on the predetermined maximum quantity of reporting times, that reporting of a first event subscription is completed; and wherein the second network element is configured to receive the delete message.

15. The system according to claim 14, wherein the predetermined maximum quantity of reporting time indicates that a subscription event report corresponding to the user is to be removed in response to statistics of a report of the first subscription event configuration of the user group are being collected.

16. The system according to claim 14, wherein the predetermined maximum quantity of reporting times indicates that subscription event reporting corresponding to the user is completed.

17. The system according to claim 14, wherein the second network element is a unified data management network element.

18. The system according to claim 14, wherein the second network element is a home subscriber server.

19. The system according to claim 14, wherein the exposure function network element is a service capability exposure function network element.

20. The system according to claim 14, wherein the exposure function network element is a network exposure function network element.

* * * * *